United States Patent
Armstrong et al.

(10) Patent No.: US 12,254,403 B2
(45) Date of Patent: *Mar. 18, 2025

(54) METHOD AND SYSTEM FOR FILL LEVEL DETERMINATION

(71) Applicant: Compology LLC, Pittsburgh, PA (US)

(72) Inventors: Justin Armstrong, San Francisco, CA (US); Shandy Brown, San Francisco, CA (US); Mark Stefanski, San Francisco, CA (US); Matthew Duncan, San Francisco, CA (US)

(73) Assignee: Compology LLC, Pittsburgh, PA (US)

( * ) Notice: Subject to any disclaimer, the term of this patent is extended or adjusted under 35 U.S.C. 154(b) by 939 days.

This patent is subject to a terminal disclaimer.

(21) Appl. No.: 17/161,437

(22) Filed: Jan. 28, 2021

(65) Prior Publication Data

US 2021/0158097 A1 May 27, 2021

Related U.S. Application Data

(63) Continuation-in-part of application No. 16/709,127, filed on Dec. 10, 2019, now Pat. No. 10,943,356.

(Continued)

(51) Int. Cl.
*G06N 3/08* (2023.01)
*G06F 18/21* (2023.01)
(Continued)

(52) U.S. Cl.
CPC .......... *G06N 3/08* (2013.01); *G06F 18/2148* (2023.01); *G06F 18/2193* (2023.01);
(Continued)

(58) Field of Classification Search
CPC .......... G06N 3/08; G06N 3/045; G06N 3/044; G06N 3/048; G06N 20/10; G06F 18/2148;
(Continued)

(56) References Cited

U.S. PATENT DOCUMENTS 4,485,831 A 12/1984 Ungerleider
4,646,793 A 3/1987 Sherratt
(Continued)

FOREIGN PATENT DOCUMENTS

AU 2013100511 B4 1/2014
CA 2558906 A1 4/2007
(Continued)

OTHER PUBLICATIONS

Redmon, Joseph , et al., "YOLOv3: An Incremental Improvement", arXiv:1804.02767, submitted on Apr. 8, 2018, https://doi.org/10.48550/arXiv.1804.02767.

(Continued)

*Primary Examiner* — Santiago Garcia
(74) *Attorney, Agent, or Firm* — K&L Gates LLP

(57) ABSTRACT

A method for fill level determination, which can include receiving a set training set, training a neural network, selecting reference images, and/or determining a container fill level. A system for fill level determination, which can include a computing system, one or more containers, and/or one or more content sensors.

12 Claims, 15 Drawing Sheets

Related U.S. Application Data

(60) Provisional application No. 62/778,775, filed on Dec. 12, 2018.

(51) Int. Cl.
    *G06F 18/214*    (2023.01)
    *G06F 18/241*    (2023.01)
    *G06T 7/00*    (2017.01)
    *G06V 10/764*    (2022.01)
    *G06V 20/52*    (2022.01)
    *G06V 20/64*    (2022.01)

(52) U.S. Cl.
    CPC ............ *G06F 18/241* (2023.01); *G06T 7/001* (2013.01); *G06V 10/764* (2022.01); *G06V 20/52* (2022.01); *G06V 20/64* (2022.01); *G06T 2207/20084* (2013.01); *G06T 2207/30164* (2013.01); *G06T 2207/30232* (2013.01)

(58) Field of Classification Search
    CPC ... G06F 18/2193; G06F 18/241; G06T 7/001; G06T 2207/20084; G06T 2207/30164; G06T 2207/30232; G06V 10/764; G06V 20/52; G06V 20/64; G06V 2201/06
    See application file for complete search history.

(56) References Cited

U.S. PATENT DOCUMENTS

| | | |
|---|---|---|
| 4,926,879 A | 5/1990 | Sevrain et al. |
| 5,257,577 A | 11/1993 | Clark |
| 5,299,493 A | 4/1994 | Durbin et al. |
| 5,609,193 A | 3/1997 | Steckler |
| 5,708,424 A | 1/1998 | Orlando et al. |
| 5,812,060 A | 9/1998 | Despain et al. |
| 5,927,142 A | 7/1999 | Mercer |
| 5,964,258 A | 10/1999 | Schoenbauer |
| 6,123,017 A | 9/2000 | Little et al. |
| 6,125,213 A | 9/2000 | Morimoto |
| 6,272,466 B1 | 8/2001 | Harada et al. |
| 6,369,715 B2 | 4/2002 | Bennett et al. |
| 6,561,085 B1 | 5/2003 | Durbin et al. |
| 6,822,565 B2 | 11/2004 | Thomas et al. |
| 6,951,615 B2 | 10/2005 | Tripodi et al. |
| 7,032,820 B2 | 4/2006 | Kreiner et al. |
| 7,313,464 B1 | 12/2007 | Perreault et al. |
| 7,421,112 B2 | 9/2008 | Calver et al. |
| 7,423,541 B2 | 9/2008 | Miller |
| 7,441,569 B2 | 10/2008 | Lease |
| 7,728,730 B2 | 6/2010 | Langlois et al. |
| 7,853,142 B2 | 12/2010 | Meyers et al. |
| 7,979,146 B2 | 7/2011 | Ullrich et al. |
| 7,999,688 B2 | 8/2011 | Healey et al. |
| 8,068,025 B2 | 11/2011 | Devenyi et al. |
| 8,185,277 B2 | 5/2012 | Flood et al. |
| 8,339,269 B2 | 12/2012 | Sherron |
| 8,565,536 B2 | 10/2013 | Liu |
| 8,620,393 B2 | 12/2013 | Bornstein et al. |
| 8,754,757 B1 | 6/2014 | Ullrich et al. |
| 9,019,087 B2 | 4/2015 | Bakircioglu et al. |
| 9,298,260 B2 | 3/2016 | Karaoguz et al. |
| 9,301,094 B2 | 3/2016 | Jajoo et al. |
| 9,352,887 B2 | 5/2016 | Poss et al. |
| 9,443,410 B1 | 9/2016 | Constien |
| 9,826,149 B2 * | 11/2017 | Chalom ............... G06V 10/771 |
| 9,905,090 B2 | 2/2018 | Ullrich et al. |
| 9,952,600 B2 | 4/2018 | Gurin |
| 10,064,007 B1 | 8/2018 | Deluca et al. |
| 10,405,133 B1 | 9/2019 | Merjanian et al. |
| 10,416,311 B2 | 9/2019 | Huang et al. |
| 10,559,208 B1 | 2/2020 | McAlpine et al. |
| 10,621,873 B1 | 4/2020 | Spiel et al. |
| 10,642,362 B2 | 5/2020 | Eagleman et al. |
| 10,798,522 B1 | 10/2020 | Benjamin et al. |
| 10,943,356 B2 | 3/2021 | Armstrong et al. |
| 2002/0108507 A1 | 8/2002 | May et al. |
| 2004/0129781 A1 | 7/2004 | Kreiner et al. |
| 2004/0199401 A1 | 10/2004 | Wagner et al. |
| 2005/0080520 A1 | 4/2005 | Kline et al. |
| 2005/0083197 A1 | 4/2005 | Glenn et al. |
| 2005/0126958 A1 | 6/2005 | Bohlig et al. |
| 2006/0196937 A1 | 9/2006 | Kreiner et al. |
| 2006/0261964 A1 | 11/2006 | Maetzke |
| 2007/0041600 A1 | 2/2007 | Zachman |
| 2007/0133980 A1 | 6/2007 | Meyers et al. |
| 2007/0219862 A1 | 9/2007 | Casella et al. |
| 2007/0260466 A1 | 11/2007 | Casella et al. |
| 2008/0031525 A1 | 2/2008 | Yamaguchi |
| 2008/0061125 A1 | 3/2008 | Langlois et al. |
| 2008/0061977 A1 | 3/2008 | Maruca et al. |
| 2008/0140422 A1 | 6/2008 | Hovestadt et al. |
| 2009/0014363 A1 | 1/2009 | Gonen et al. |
| 2009/0161907 A1 | 6/2009 | Healey et al. |
| 2009/0321511 A1 | 12/2009 | Browne |
| 2010/0001867 A1 | 1/2010 | Rodrigue et al. |
| 2010/0017127 A1 | 1/2010 | Pepitone et al. |
| 2010/0042940 A1 | 2/2010 | Monday et al. |
| 2010/0069035 A1 | 3/2010 | Johnson |
| 2010/0092089 A1 | 4/2010 | Wilson et al. |
| 2010/0217715 A1 | 8/2010 | Lipcon |
| 2010/0287073 A1 | 11/2010 | Kocis et al. |
| 2010/0312601 A1 | 12/2010 | Lin |
| 2011/0000295 A1 | 1/2011 | Kritlow |
| 2011/0063208 A1 | 3/2011 | Van et al. |
| 2011/0137812 A1 | 6/2011 | Sherga |
| 2011/0148634 A1 | 6/2011 | Putz |
| 2011/0175739 A1 | 7/2011 | McFeeters |
| 2012/0010746 A1 | 1/2012 | Sundholm |
| 2012/0150754 A1 | 6/2012 | Belady et al. |
| 2012/0192646 A1 | 8/2012 | Arnold et al. |
| 2012/0209783 A1 | 8/2012 | Smith et al. |
| 2012/0314059 A1 | 12/2012 | Hoffmann et al. |
| 2013/0006522 A1 | 1/2013 | Vellaikal et al. |
| 2013/0096731 A1 | 4/2013 | Tamari et al. |
| 2013/0180892 A1 | 7/2013 | Marrapodi et al. |
| 2013/0218456 A1 | 8/2013 | Zelek et al. |
| 2013/0278067 A1 | 10/2013 | Poss et al. |
| 2013/0295970 A1 | 11/2013 | Sheshadri et al. |
| 2013/0345969 A1 | 12/2013 | Udeshi et al. |
| 2014/0005039 A1 | 1/2014 | Ohishi et al. |
| 2014/0050397 A1 | 2/2014 | Badholm et al. |
| 2014/0074298 A1 | 3/2014 | Jambeck et al. |
| 2014/0214697 A1 | 7/2014 | McSweeney |
| 2014/0229501 A1 | 8/2014 | Josefiak |
| 2014/0266698 A1 | 9/2014 | Hall et al. |
| 2014/0278630 A1 | 9/2014 | Gates et al. |
| 2014/0351328 A1 | 11/2014 | Woods et al. |
| 2014/0379588 A1 * | 12/2014 | Gates ................ G06Q 10/0631 |
| | | 705/308 |
| 2015/0081212 A1 | 3/2015 | Mitchell et al. |
| 2015/0088792 A1 | 3/2015 | O'Neill et al. |
| 2015/0148077 A1 | 5/2015 | Jelle |
| 2015/0186497 A1 | 7/2015 | Patton et al. |
| 2015/0271126 A1 | 9/2015 | Menayas et al. |
| 2015/0271639 A1 | 9/2015 | Ziskind et al. |
| 2015/0310606 A1 | 10/2015 | Shreve et al. |
| 2015/0339864 A1 | 11/2015 | Herron |
| 2015/0348252 A1 | 12/2015 | Mask |
| 2016/0003627 A1 | 1/2016 | Bonhomme |
| 2016/0026253 A1 | 1/2016 | Bradski et al. |
| 2016/0195602 A1 | 7/2016 | Meadow |
| 2016/0212590 A1 | 7/2016 | Decorte et al. |
| 2016/0266258 A1 | 9/2016 | Huang et al. |
| 2016/0292862 A1 | 10/2016 | Mask |
| 2016/0355308 A1 | 12/2016 | Poss et al. |
| 2016/0358429 A1 | 12/2016 | Ullrich et al. |
| 2017/0109027 A1 | 4/2017 | Shubs et al. |
| 2017/0124643 A1 | 5/2017 | Haimi et al. |
| 2017/0169673 A1 | 6/2017 | Billington et al. |
| 2017/0206889 A1 | 7/2017 | Lev-Tov et al. |
| 2017/0223499 A1 | 8/2017 | Jernigan |
| 2017/0289754 A1 | 10/2017 | Anderson et al. |
| 2017/0294000 A1 * | 10/2017 | Shen ................ G06F 3/0482 |

(56) References Cited

U.S. PATENT DOCUMENTS

| | | |
|---|---|---|
| 2017/0353829 A1 | 12/2017 | Kumar et al. |
| 2017/0366616 A1 | 12/2017 | Rodrigues Nascimento et al. |
| 2018/0027371 A1 | 1/2018 | Austraat et al. |
| 2018/0075108 A1 | 3/2018 | Park et al. |
| 2018/0082279 A1 | 3/2018 | Vasgaard et al. |
| 2018/0089840 A1* | 3/2018 | Yan .................. G06T 7/0014 |
| 2018/0108023 A1 | 4/2018 | Stewart et al. |
| 2018/0165970 A1 | 6/2018 | Namgoong et al. |
| 2018/0174067 A1 | 6/2018 | Spiro et al. |
| 2018/0189835 A1 | 7/2018 | Deluca et al. |
| 2018/0192237 A1 | 7/2018 | Privitera et al. |
| 2018/0220061 A1 | 8/2018 | Wang et al. |
| 2018/0232767 A1 | 8/2018 | Garg et al. |
| 2018/0262903 A1 | 9/2018 | Ryan et al. |
| 2018/0268377 A1 | 9/2018 | Mofardin et al. |
| 2018/0285535 A1 | 10/2018 | Zhu et al. |
| 2018/0312095 A1 | 11/2018 | Eletrabi |
| 2018/0338001 A1 | 11/2018 | Pereira Cabral et al. |
| 2018/0338031 A1 | 11/2018 | Subramanian et al. |
| 2018/0374046 A1 | 12/2018 | Powers et al. |
| 2019/0007484 A1 | 1/2019 | Chen et al. |
| 2019/0026915 A1 | 1/2019 | Seaman et al. |
| 2019/0102726 A1 | 4/2019 | Ushiki et al. |
| 2019/0164081 A1 | 5/2019 | Deluca et al. |
| 2019/0295223 A1 | 9/2019 | Shen et al. |
| 2019/0313204 A1 | 10/2019 | Ayoub et al. |
| 2020/0013024 A1 | 1/2020 | Armstrong et al. |
| 2020/0100052 A1 | 3/2020 | Ellis et al. |
| 2020/0126026 A1* | 4/2020 | Garlapati .............. G06F 18/285 |
| 2020/0145783 A1 | 5/2020 | Hanada et al. |
| 2020/0162842 A1 | 5/2020 | Jones |
| 2020/0252742 A1 | 8/2020 | Yeon et al. |
| 2020/0344567 A1 | 10/2020 | Wirola et al. |
| 2021/0158308 A1 | 5/2021 | Armstrong et al. |
| 2022/0180501 A1* | 6/2022 | Perez .................. G06T 7/0004 |

FOREIGN PATENT DOCUMENTS

| | | |
|---|---|---|
| CN | 101482742 B | 8/2011 |
| EP | 2284104 A1 | 2/2011 |
| GB | 2386686 A | 9/2003 |
| WO | 2012015664 A1 | 2/2012 |
| WO | 2012164098 A1 | 12/2012 |
| WO | 2014079586 A1 | 5/2014 |

OTHER PUBLICATIONS

"Vicentini et al. Sensorized waste collection container for content estimation and collection optimization. Waste Management 29 (2009) [retrieved on Oct. 29, 2014]. Retrieved from the Internet: pp. 1467-1472.", Jan. 14, 2015 00:00:00.0.

Gates, Jason, "Fullness Monitoring for Waste-Image-based vs. Ultrasonic Sensors", https://medium.com/@compology/fullness-monitoring-for-waste-image-based-vs-ultrasonic-sensors-29f360bf01e8, dated Jul. 11, 2017.

Karpathy, Andrej, "CS231n Convolutional Neural Networks for Visual Recognition", http://cs231n.github.io/neural-networks-2/#losses.

Lamba, Harshall, "One Shot Learning with Siamese Networks using Keras", https://towardsdatascience.com/one-shot-learning-with-siamese-networks-using-keras-17f34e75bb3d, dated Jan. 20, 2019.

Mims, Christopher, "Help, We're Drowning in Recycling! Cue the 'Internet of Trash'", Appeared in the Mar. 2, 2019, print edition as 'The 'Internet of Trash' Aims to Sort Out Our Recycling Mess' https://djreprints.com.

* cited by examiner training images →

Fill level: 0    Container ID: 107

Fill level: 25    Container ID: 107

Fill level: 90    Container ID: 107

METHOD AND SYSTEM FOR FILL LEVEL DETERMINATION

CROSS-REFERENCE TO RELATED APPLICATIONS

This application is a continuation-in-part of U.S. application Ser. No. 16/709,127, filed 10 Dec. 2019, which claims the benefit of U.S. Provisional Application No. 62/778,775, filed 12 Dec. 2018, each of which is incorporated in its entirety by this reference.

This application is related to U.S. application Ser. No. 17/145,021 filed 8 Jan. 2021, which is a continuation-in-part of U.S. application Ser. No. 16/570,936 filed 7 Nov. 2019, which is a continuation-in-part of U.S. application Ser. No. 16/288,593 filed 28 Feb. 2019, which is a continuation of U.S. application Ser. No. 14/479,136 filed 5 Sep. 2014, which is a continuation-in-part of U.S. application Ser. No. 14/211,709 filed 14 Mar. 2014, which claims the benefit of U.S. Provisional Application No. 61/801,021 filed 15 Mar. 2013, and also which claims the benefit of U.S. Provisional Application Ser. No. 62/731,249 filed 14 Sep. 2018, and U.S. Provisional Application Ser. No. 62/795,957 filed 23 Jan. 2019, each of which is incorporated in its entirety by this reference.

TECHNICAL FIELD

This invention relates generally to the image analysis field, and more specifically to a new and useful method and system for fill level determination in the image analysis field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
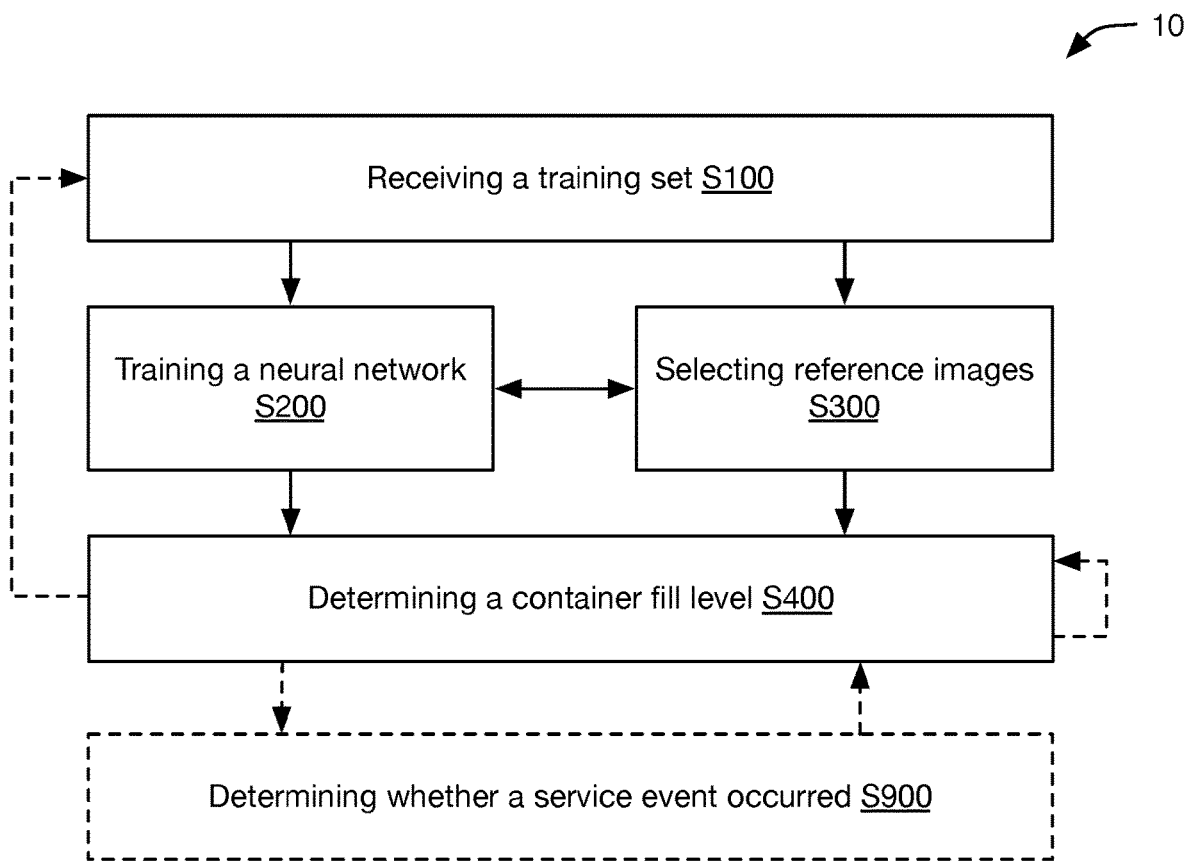
FIG. 1 is a schematic representation of an embodiment of the method.

A method 10 for fill level determination preferably includes receiving a training set S100, training a neural network S200, selecting reference images S300, and/or determining a container fill level S400 (e.g., as shown in FIG. 1). However, the method 10 can additionally or alternatively include any other suitable elements.

Figure 2:
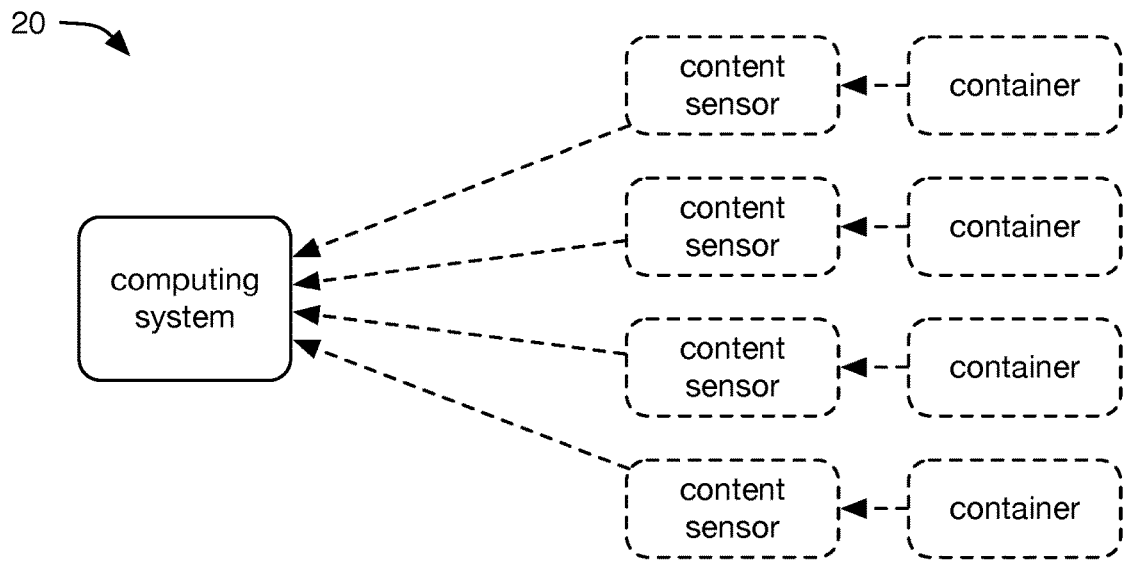
FIG. 2 is a schematic representation of an embodiment of the system.

A system 20 for fill level determination preferably includes a computing system (e.g., remote server), and can additionally or alternatively include one or more containers, one or more content sensors (e.g., imaging devices) associated with each container, and/or any other suitable elements (e.g., as shown in FIG. 2).

The method 10 is preferably performed using the system 20, but can additionally or alternatively be performed by any other suitable system.

2. System

The containers can include dumpster (e.g., front load containers, roll off containers, etc.), shipping containers (e.g., intermodal freight container, unit load device, trailer or semi-trailer, etc.), sections of a vehicle (e.g., land, sea, air, and/or space vehicle) such as vehicle cargo holds, rooms of a structure (e.g., a fixed structure such as a building), and/or any other suitable containers.

Figure 3A:
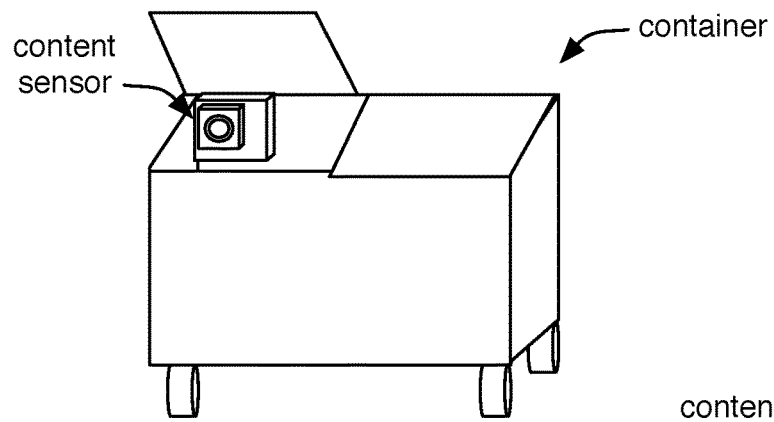
FIGS. 3A-3C are schematic representations of various examples of one or more content sensors coupled to a container.
Figure 3B:
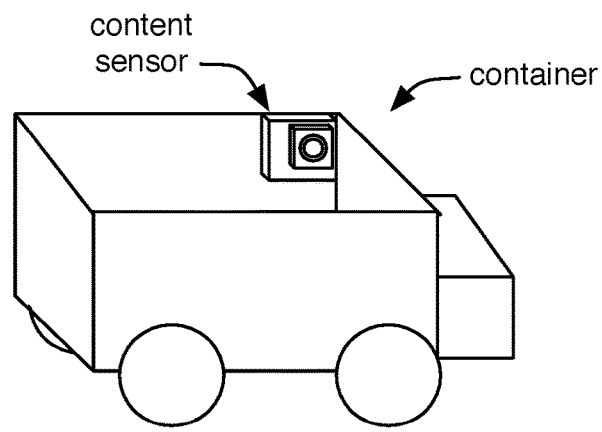
Figure 3C:
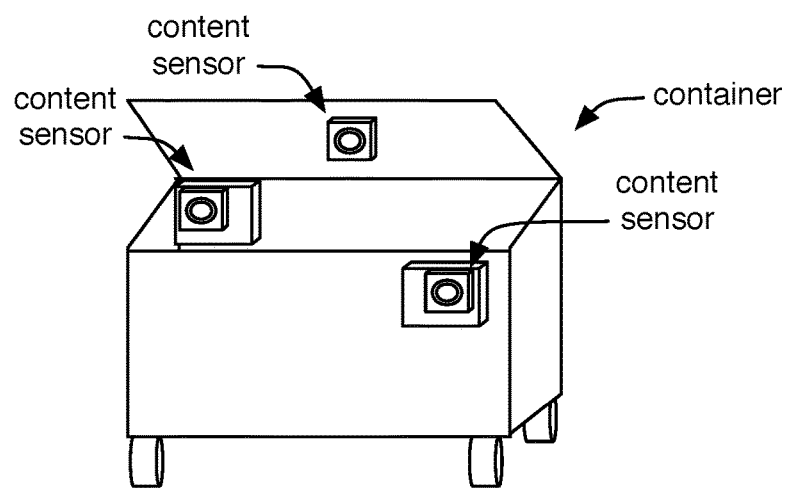

The content sensor is preferably configured to sense (e.g., image) the interior of the container that it is associated with (e.g., image and/or otherwise sense the contents of the container), more preferably configured to sense substantially all of the interior but alternatively configured to image any suitable portion thereof. The content sensor preferably has a fixed position and/or orientation relative to the container (e.g., is mechanically coupled to the container, preferably by a fixed coupling) but can alternatively have any other suitable spatial relationship with respect to the container (e.g., as shown in FIGS. 3A-3C).

The content sensor preferably includes one or more imaging devices. The imaging device is preferably an optical sensor (e.g., camera), but can additionally or alternatively include an ultrasound imaging device and/or any other suitable imaging devices. Examples of optical sensors include a monocular camera, stereocamera, multi-lens or multi-view camera, color camera (e.g., a RGB camera) such as a charge coupled device (CCD) or a camera including a CMOS sensor, grayscale camera, multispectral camera (narrow band or wide band), hyperspectral camera, ultraspectral camera, spectral camera, spectrometer, time of flight camera, high-, standard-, or low-dynamic range cameras, range imaging system (e.g., LIDAR system), active light system (e.g., wherein a light, such as an IR LED, is pulsed and directed at the subject and the reflectance difference measured by a sensor, such as an IR sensor), thermal sensor, infra-red imaging sensor, projected light system, full spectrum sensor, high dynamic range sensor, or any other suitable imaging system. The optical sensor is preferably configured to capture a 2-dimensional or 3-dimensional image, but can alternatively capture any a measurement having any other suitable dimension. The image is preferably single, multi-pixel, time-averaged or sum total measurement of the intensity of a signal emitted or reflected by objects within a field of view, but can alternatively be a video (e.g., a set of images or frames), or any other suitable measurement. The image preferably has a resolution (e.g., cycles per millimeter, line pairs per millimeter, lines of resolution, contrast vs. cycles/mm, modulus of the OTF, or any other suitable measure) capable of resolving a 1 $cm^3$ object at a sensor distance of at least 10 feet from the object, but can alternatively have a higher or lower resolution.

The content sensor can optionally include one or more emitters that are configured to emit electromagnetic signals, audio signals, compounds, or any other suitable interrogator that the content sensor is configured to measure. However, the content sensor can additionally or alternatively measure signals from the ambient environment. Examples of sensor-emitter pairs include LIDAR systems, time-of-flight systems, ultrasound systems, radar systems, X-ray systems, and/or any other suitable systems. In embodiments in which the content sensor includes an emitter, the content sensor can optionally include a reference sensor that measures the ambient environment signals (e.g., wherein the content sensor measurement can be corrected by the reference sensor measurement).

The content sensor can optionally include a lens that functions to adjust the optical properties of the incident signal on the sensor. For example, the optical sensor can include a fish-eye lens to broaden the area monitored by the optical sensor, wherein the resultant distortion is known and can be adjusted for during image processing. However, the lens can be a wavelength filter, polarizing filter, or any other suitable lens. The content sensor can additionally or alternatively include a physical or digital filter, such as a noise filter that corrects for interferences in the measurement.

The content sensors can optionally include one or more communication modules. The communication module preferably functions to communicate data from the content sensor to a second system (e.g., the computing system). The data can be measurements from the content sensor (and/or any other suitable components), processed measurements, instructions, pickup requests, and/or any other suitable data. The second system can be a device, server system, or any other suitable computing system. The second system can be remote or wired to the communication system. Examples of the second system include a mobile device (e.g., smartphone, tablet, computer), server system, or any other suitable computing system. The communication system can be a wireless or wired communication system. The communication system can be a cellular, WiFi, Zigbee, Z-Wave, near-field communication system (e.g., Bluetooth, RF, NFC, etc.), Ethernet, powerline communication, or any other suitable communication system. The communication system is preferably operable in a standby or off mode, wherein the communication system consumes power at a rate less than a threshold rate, and an on or communication mode, wherein the communication system consumes power at a rate required to communicate data. However, the communication system can be operable in any other suitable mode.

The content sensor can optionally include one or more auxiliary sensors, such as IMU sensors (e.g., accelerometer, gyroscope, magnetometer, etc.), geopositioning elements (e.g., GPS receiver), weight sensors, audio sensors, and/or any other suitable auxiliary sensors. However, the imaging devices can additionally or alternatively include any other suitable elements in any suitable arrangement.

3. Method

3.1 Receiving a Training Set

Receiving a training set S100 preferably functions to provide a set of input data for training a fill level determination model (i.e., fullness model).

Figure 4A:
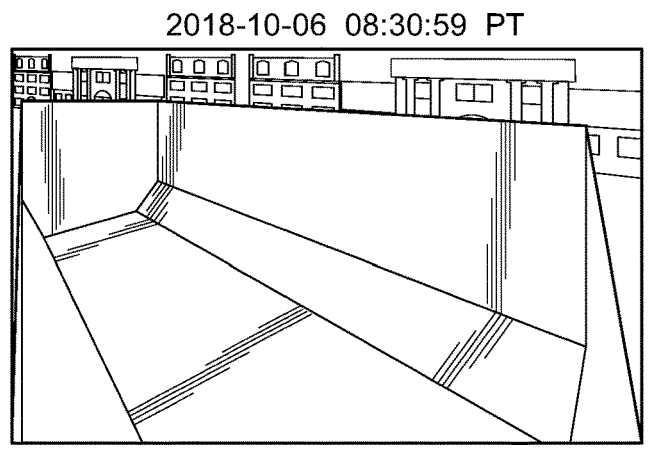
FIGS. 4A-4B are depictions of subsets associated with a first and second container, respectively, of an example of a training set.
Figure 4A:
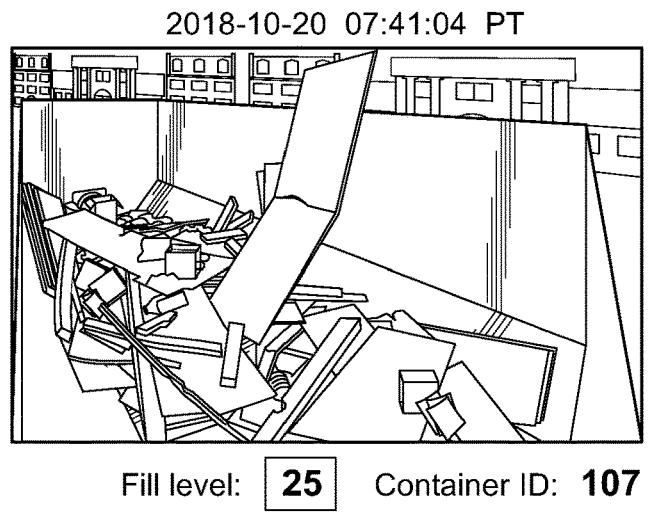
Figure 4A:
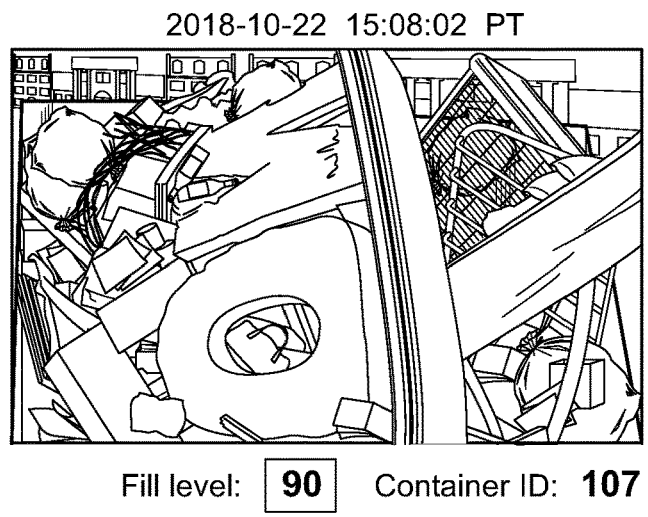
Figure 4B:
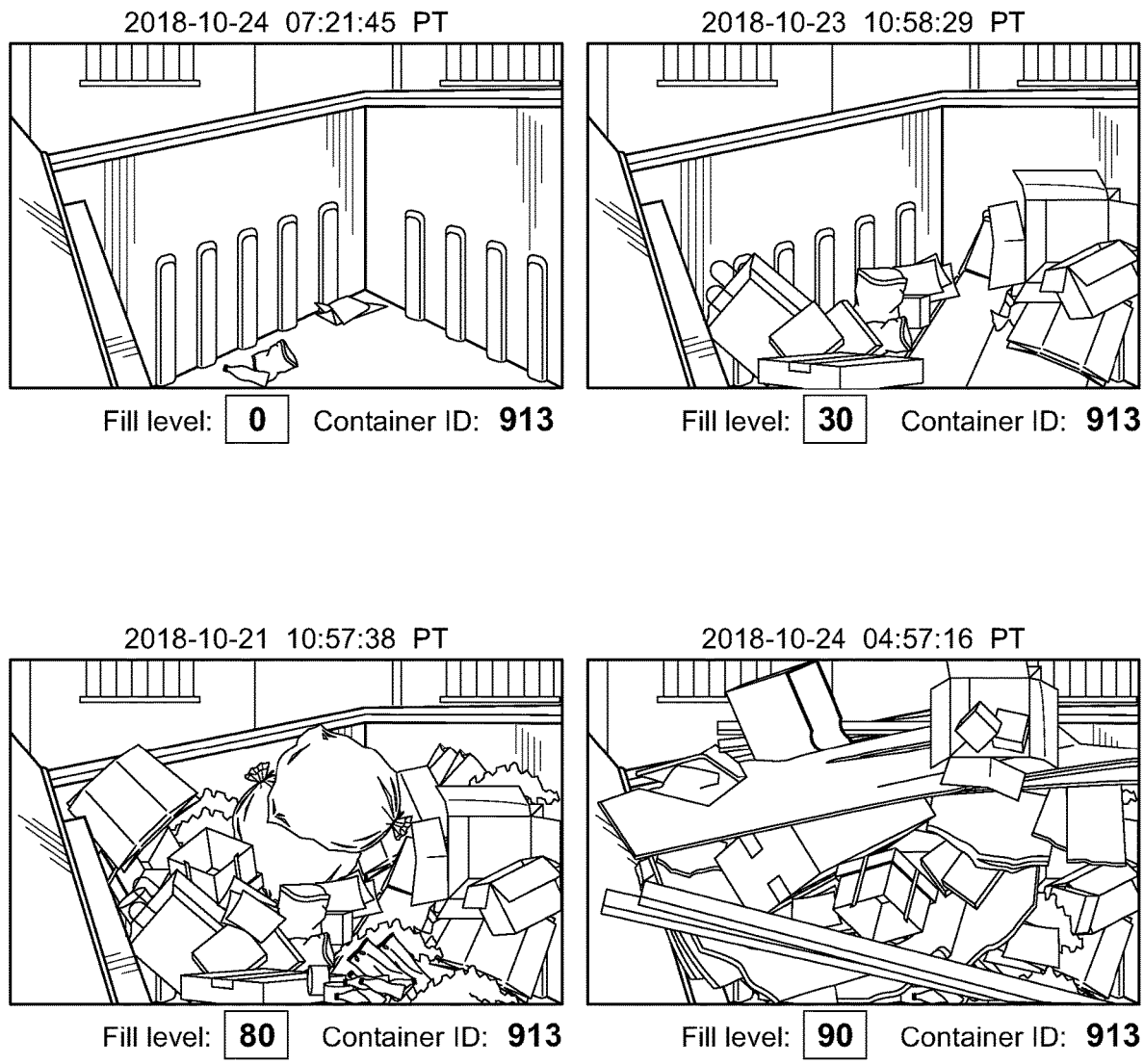

The training set preferably includes a plurality of images. Each image is preferably associated with a container (e.g., by a container ID associated with the image). The training set preferably includes a plurality of images from each of a plurality of containers (e.g., as shown in FIGS. 4A-4B). The plurality of containers preferably includes containers of different types (e.g., roll-off container, front load container, etc.). However, the training set can alternatively include images of a single type of container (e.g., wherein the training set is intended for use in training a neural network to determine the fill level of only containers of that type), and/or S100 can include receiving multiple training sets (e.g., wherein each training set includes images of a single type of container, preferably a different type than for the other training sets). The images for a given container preferably include images of the container in different states of fill, more preferably including various fill levels between 0 (e.g., unfilled) and 100% (e.g., filled).

In embodiments in which a container is associated with multiple cameras, the images are preferably grouped by container. All images of an image group are preferably images captured substantially concurrently (e.g., simultaneously, within a threshold time of each other, with substantially no change in container content between the image captures, etc.), but can alternatively be captured with any other suitable timing relative to each other. Each image of an image group is preferably associated with a different camera of the container (e.g., associated with a camera ID for that camera).

Although reference may be made to a single image, a person of skill in the art will recognize that the method can be performed using image groups rather than individual images (e.g., in embodiments in which multiple cameras are associated with a container).

The training set can optionally include data sampled by one or more auxiliary sensors of the imaging device ("auxiliary data"), such as sensors described above regarding the system 20. The auxiliary data is preferably sampled substantially concurrent with the sampling time of the image (or image group) with which it is associated (e.g., simultaneously, within a threshold time of the image sampling time, with substantially no change in container content between the image sampling and auxiliary data sampling, etc.). The auxiliary data can additionally or alternatively include a time series of data (e.g., associated with an indication of the image sampling time relative to the time series, preferably wherein the time series overlaps the image sampling time) and/or data sampled with any other suitable timing. However, the training set can additionally or alternatively include any other suitable data types.

The training set is preferably a labeled set (e.g., wherein each image is associated with a known fill level). The fill level (e.g., fullness metric) preferably represents an occupied fraction of container storage volume (e.g., wherein an empty container has a fill level of 0% and a completely full container has a fill level of 100%). The fill level does not necessarily represent a uniform level of container filling (e.g., wherein a tall mound of contents within a corner of the container may represent the same fill level as a shallow layer of contents spread uniformly across the container floor, despite reaching a much higher maximum height). In one example, the known fill levels can be determined by providing the images to human classifiers and using their fill level determinations as the known fill level. In another example, an image associated with a predetermined condition can be associated with a predetermined fill level (e.g., 100% when the upper container edge cannot be detected in the image, 100% when the container lid consistently fails to close, 0% after sampling accelerometer data associated with emptying the container, etc.).

The fill level can additionally or alternatively represent any other suitable type of fill level, such as an occupied fraction of container storage area (e.g., floorspace coverage, wherein an empty container has a fill level of 0% and a container whose entire floor is covered by contents has a fill level of 100%, whether or not additional unfilled volume remains in the container; wall coverage, such as representing accessibility and/or usage of tie-downs, wall-mounted shelving, and/or any other suitable elements; etc.). In one example, a right cuboidal container interior contains a single right cuboidal object (or analogously, a stack of multiple objects, wherein the stack defines a substantially right cuboidal shape), wherein the container interior is 4 meters tall with a 10 square meter floor, and the object has dimensions of 1×2×4 meters, corresponding to a volumetric fullness metric of 20%. In this example, if the object is placed in the container with a 2×4 meter face on the floor, so that it is 1 meter tall, the floorspace coverage metric is 80%; if it is placed with a 1×4 meter face on the floor, so that it is 2 meters tall, the floorspace coverage metric is 40%; and if it is placed with a 1×2 meter face on the floor, so that it is 4 meters tall, the floorspace coverage metric is 20%. However, the training set can be labeled in any other suitable manner.

In some embodiments the training set includes a first training set (e.g., for use in S200) and a second training set (e.g., for use in S300). The first and second set are preferably disjoint (e.g., wherein the first and second set are complementary) but can alternatively be overlapping. However, the training set can additionally or alternatively include any other suitable subsets.

The training set can be received all at once, received over time, received throughout performance of the method, and/or received with any other suitable timing. For example, the method can optionally include continuing to receive training images during, and/or after performance of other elements of the method, such as S200, S300, and/or S400.

S100 can additionally or alternatively include receiving an additional training set, which preferably functions to provide a set of input data for training a diverter model (e.g., unsuitable label determination model). The additional training set can be analogous to that described above regarding the training set for training the fullness model (e.g., can be the same training set as described above, can have similar or identical aspects to those described above, etc.), but can additionally or alternatively include any other suitable training data.

Each image in the additional training set can be associated with information indicative of the image's suitability for use as an input to the fullness model (e.g., labeled with labels such as a candidate label or an unsuitable label, labeled with a suitability score, an unsuitability score, and/or a score associated with one or more unsuitable conditions, etc.). The suitable images (e.g., images labelled with a candidate label, with high suitability scores, and/or with low unsuitability scores, etc.) can include: images depicting a container interior, images captured by a content sensor that is not obscured (e.g., the content sensor is not covered by a box, the content sensor includes a clean lens, and/or the content sensor is otherwise not blocked), and/or any other suitable image depicting a container interior. The unsuitable images (e.g., images labelled with an unsuitable label) and/or the reason for unsuitability can include: images captured by a content sensor experiencing a malfunction, images captured by a content sensor that is obscured (e.g., the content sensor is covered by a box, the content sensor includes a dirty lens, and/or the content sensor is otherwise blocked), images captured by a content sensor wherein the content sensor field-of-view does not depict a container interior, and/or any other unsuitable images captured by the content sensor.

Figure 11:
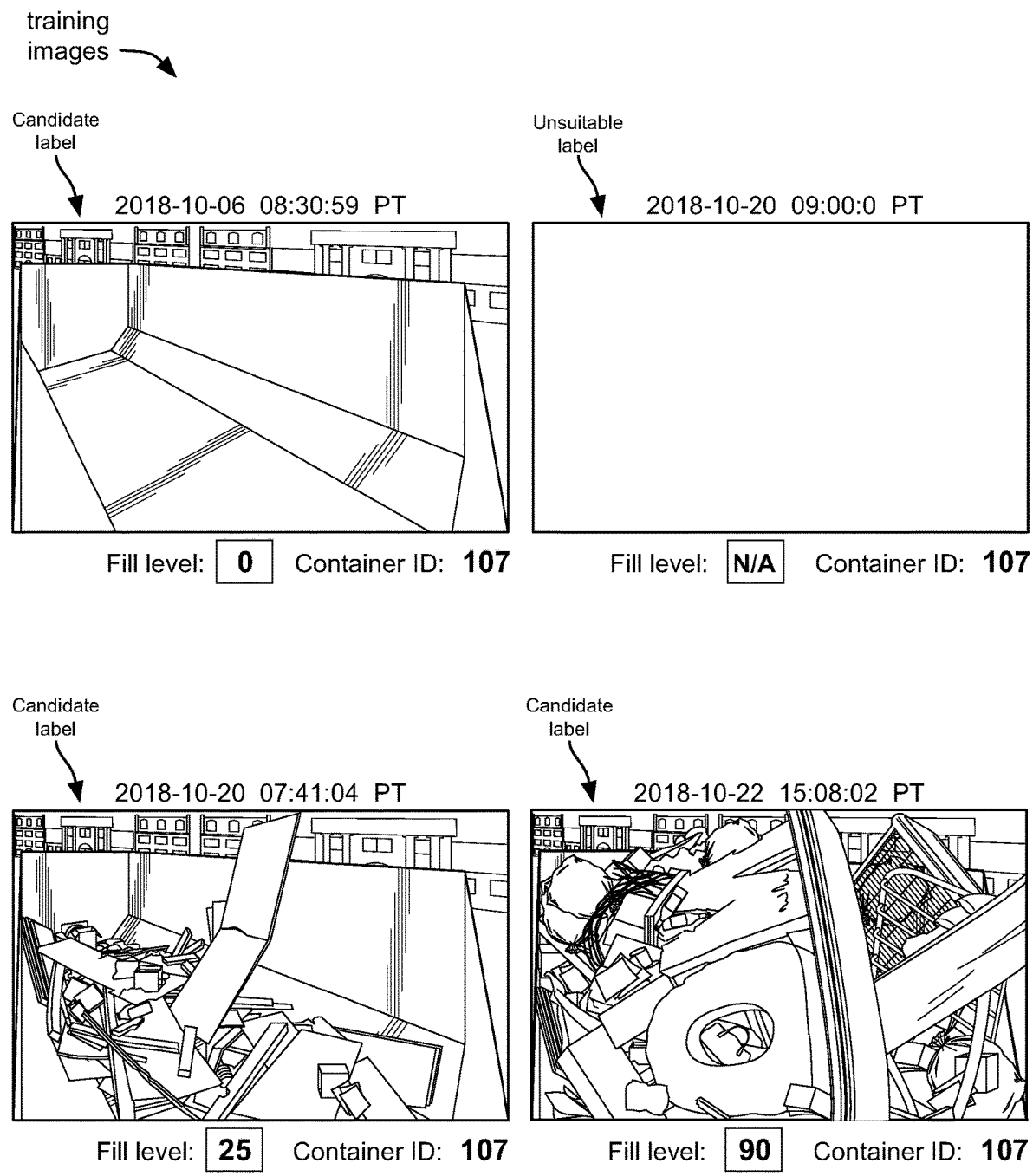
FIG. 11 is a depiction of a subset, associated with a first container, of an example of a training set.

The candidate model label can be a value (e.g., fill level, a binary value such as to indicate the image is associated with a candidate label, etc.), can be alphabetic (e.g., "candidate", "yes", etc.), and/or can be any other suitable label. The unsuitable label can be a value (e.g., binary value, such as to indicate the image is associated with an unsuitable label; integers mapped to different unsuitable label reasons, such as a 2 mapped to unsuitable reason 2, 3 mapped to unsuitable reason 3, etc.), can be alphabetic (e.g., "N/A", the unsuitable label reason, "no", etc.), and/or can include any other suitable label(s). Examples of candidate labelled images and unsuitable labelled images are depicted in FIG. 11. However, the additional training set can additionally or alternatively be labeled in any other suitable manner.

In some embodiments, S100 includes receiving a first training set associated with fill level determination (e.g., labeled with known fill levels) and receiving a second training set associated with unsuitable image determination (e.g., images labeled with candidate labels and/or unsuitable labels), wherein the training sets can be partially overlapping sets, disjoint sets, sets having a subset-superset relationship, and/or sets with any other suitable relationship. In other embodiment, S100 includes receiving a single training set associated with both fill level determination and unsuitable image determination.

However, S100 can additionally or alternatively include receiving any other suitable training set in any suitable manner.

3.2 Training a Neural Network

Training a neural network S200 preferably functions to train a model (e.g., trained neural network) for determining the container fill level based on container images. Training a neural network preferably includes optimizing a set of weight values associated with each node of the neural network (or a subset thereof), wherein each layer of the neural network preferably includes a plurality of nodes. S200 preferably includes performing supervised learning using a training set (e.g., the training set received in S100 or a subset thereof, such as the first training set), but can additionally or alternatively include performing unsupervised learning (e.g., using clustering algorithms, deep neural network clustering techniques such as Deep Cluster, recurrent neural networks, and/or other recurrent algorithms, etc.), and/or training the neural network in any other suitable manner. As a person skilled in the art would recognize, although referred to herein as a "neural network", S200 need not be limited to training a neural network, but rather can additionally or alternatively include training any other suitable classifier (e.g., linear classifiers such as logistic regression, Fisher's linear discriminant, Naïve Bayes classifier, perceptron, etc.; support vector machines such as least squares support vector machines; quadratic classifiers; kernel estimation classifiers such as k-nearest neighbors; boosting; decision trees such as random forests; learning vector quantization; etc.), and/or any other suitable model to perform the specified functionalities; accordingly, such a classifier can be employed in performance of other elements of the method 10 (e.g., in place of the "neural network").

In some embodiments, the neural network includes (e.g., is) a recurrent neural network, such as a recurrent neural network that is trained on historical (e.g., timestamped) series of images to determine the fill level of a container.

Figure 5:
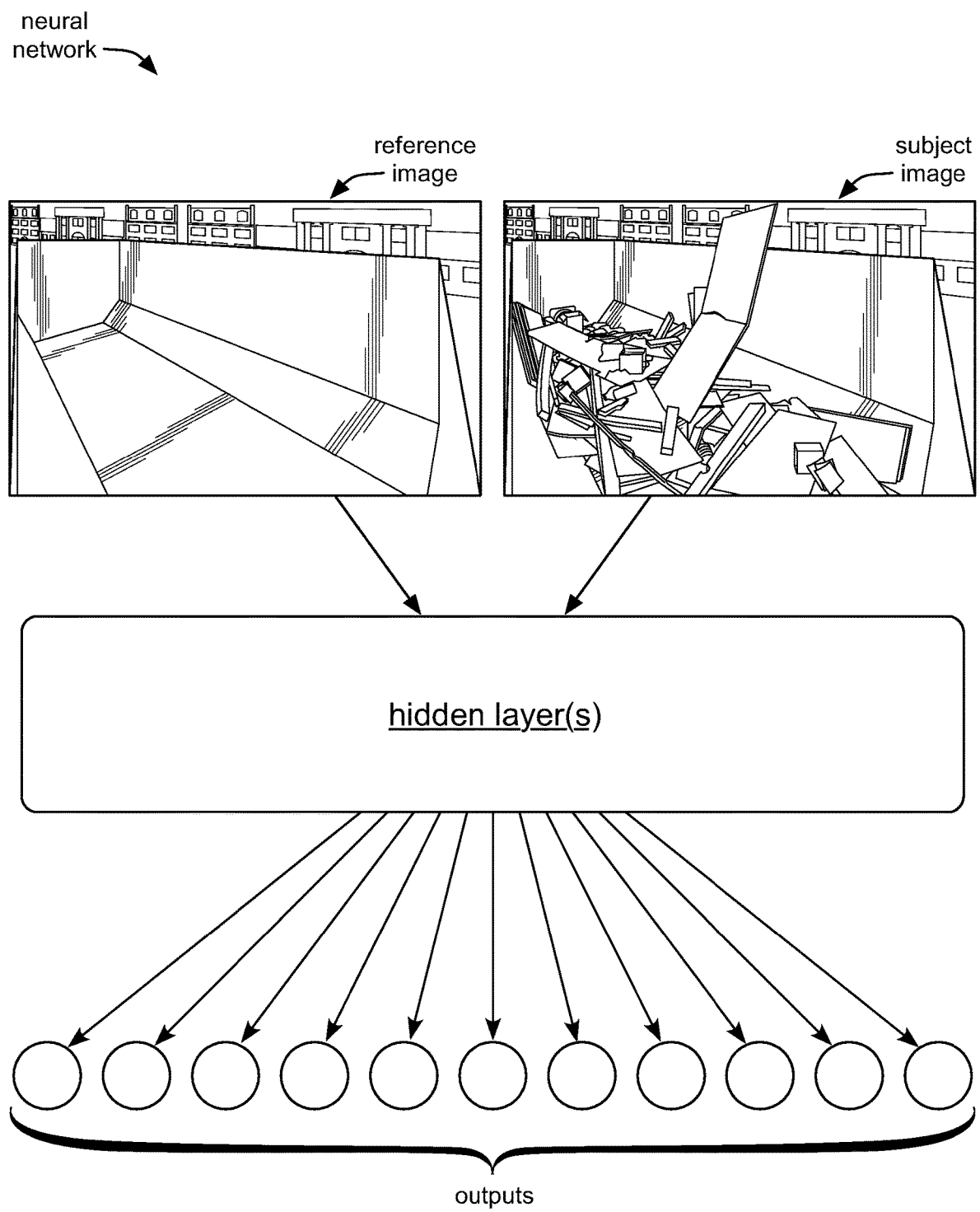
FIG. 5 is a schematic representation of an embodiment of a neural network.

The neural network is preferably trained using a subject image (e.g., the image to be assessed) and a reference image (e.g., as shown in FIG. 5). The reference image is preferably an image sampled by the same camera as the subject image (e.g., an image of the same container from the same viewpoint, such as shown by way of examples in FIGS. 4A, 4B, 5, 8, and/or 14A-14B), but the reference image can additionally or alternatively be sampled by a different camera (e.g., an image of the same container from substantially the same viewpoint, such as ±10 degrees difference from the subject image, ±20 degrees, etc.; an image of a different container from substantially the same viewpoint, such as an image of a substantially identical container and/or a container of the same type, model, shape, dimensions, and/or any other suitable container characteristics, etc.; and/or any other suitable reference image). The reference image is preferably associated with a known fill level (e.g., human-determined fill level, automatically determined fill level, etc.). Preferably, all reference images used with the neural network have a substantially equal fill level (e.g., within a threshold distance, such as ±5%, ±10%, in the range 0-15%, etc., of a target fill level), more preferably all being images of substantially empty containers (e.g., fill level less than a threshold such as 5%, 10%, 0-15%, 0-20%, etc.). However, the reference images can additionally or alternatively include images of containers of any other suitable fill levels. In alternate embodiments (e.g., in which the fill level of each reference image is known, but is not substantially equal between different reference images), the reference image can be input to the neural network in association with its (known) fill level. The reference image is preferably selected as described below (e.g., regarding S300), but can additionally or alternatively be selected in any other suitable manner.

The subject image and/or reference image (preferably both images) can be grayscale images, color images (e.g., wherein the red, green, and blue channels are provided as three separate inputs to the neural network), and/or images of any other suitable type. The images can additionally or alternatively be pre-processed (e.g., to normalize brightness and/or contrast, crop, align, undistort, etc.). In some embodiments, the subject image and/or reference image is an image group (e.g., stereoscopic image pair, images captured from opposing ends of a container, etc.) rather than a single image. In some embodiments, the neural network additionally or alternatively accepts auxiliary data as an input. However, the neural network can additionally or alternatively accept any other suitable inputs.

The neural network preferably accepts the multiple images (e.g., subject image and reference image, multiple images from each image group, etc.) as inputs. The images are preferably stacked (e.g., along a depth dimension orthogonal to the image spatial dimensions, analogous to the stacking of different color channels in a typical convolutional neural network), but can additionally or alternatively be concatenated (e.g., along one or more image spatial dimensions), provided as separate inputs (e.g., wherein the neural network includes a separate branch for each image) which are combined at a downstream layer or layers (e.g., using a fully connected layer, concatenation layer, etc.), and/or input in any other suitable manner. However, the inputs can additionally or alternatively be provided in any other suitable manner.

Figure 6:
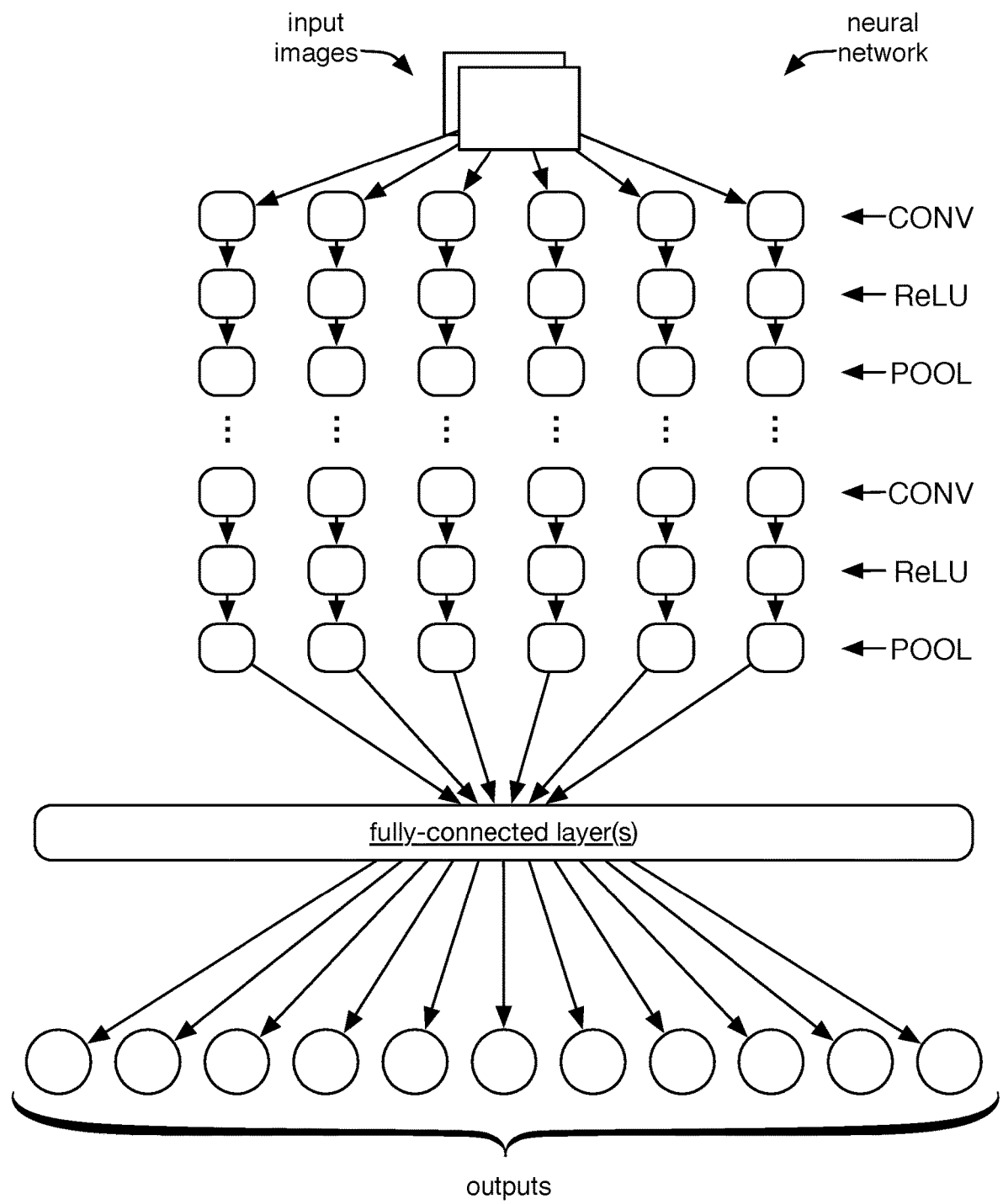
FIG. 6 is a schematic representation of an example of a convolutional neural network.

The neural network is preferably a convolutional neural network (CNN), but can additionally or alternatively include (e.g., be) a fully connected neural network, a V-NET, a Siamese network, and/or any other suitable network. The CNN preferably includes an assortment of one or more of convolutional (CONV) layers, pooling (POOL) layers (e.g., max pooling layers), activation layers (e.g., rectified linear unit (ReLU)), fully-connected layers, and/or any other suitable layers. In one example, the CNN includes a series of convolutional layers, optionally including pooling and/or activation (e.g., ReLU) layers after some or all convolutional layers, and one or more fully connected layers (e.g., as shown in FIG. 6). However, the CNN can additionally or alternatively have any other suitable structure.

The neural network preferably provides multiple output values, each corresponding to a different fill level (e.g., fill level range or bucket). The fill levels are preferably evenly spaced (e.g., over the entire possible range between 0 and 100%), such as spaced every 1%, 2%, 5%, or 10%. In one example, the CNN includes 21 outputs, each corresponding to a different bucket between 0 and 100% (e.g., spaced every 5%). Alternatively, the fill levels can be spaced unevenly, have logarithmic spacing, and/or have any other suitable spacing.

Preferably, each output represents a likelihood of and/or confidence in the corresponding fill level (e.g., the output values sum to 1). For example, the outputs can be the outputs of a softmax classifier. Alternatively, the output values can be arbitrary, such as output values of an SVM classifier and/or any other suitable classifier. In an alternate embodiment, the neural network has a single output (e.g., regression output, wherein the output value represents the fill level). However, the neural network can additionally or alternatively include any other suitable outputs.

Figure 10A:
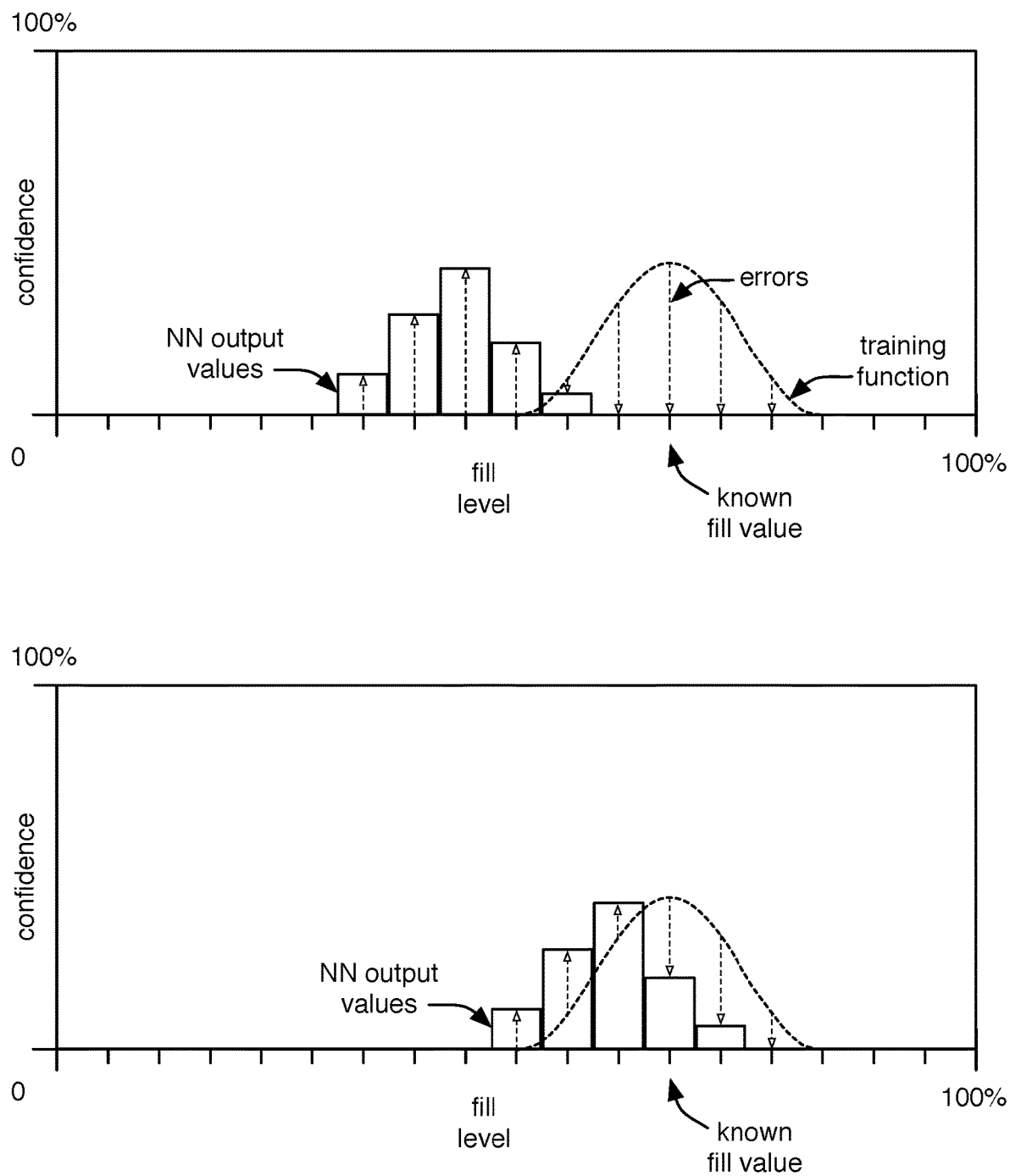
FIGS. 10A-10B are schematic representations of use of a first and second training function, respectively, for neural network training.

The loss function for training the neural network preferably includes a lower penalty for outputs close to the true fill level (e.g., and zero penalty for outputs at the correct fill level), such as a penalty which is an increasing function of distance to the true fill level (e.g., penalty calculated based on errors between the neural network output values and a training function, such as shown by way of example in FIG. 10A). For example, the training function and/or penalty function can be a linear function, quadratic function, root function, based on a statistical distribution function centered on the true value (e.g., a Gaussian distribution, Johnson distribution, etc.), such as a training function equal to the statistical distribution and/or a penalty function equal to one minus the statistical distribution, and/or any other suitable function.

Additionally or alternatively, the loss function can penalize incorrect outputs based on a rewards matrix. The loss function can receive the rewards matrix as an input (and/or can receive the matrix in any other suitable manner). The rewards matrix preferably defines penalties for incorrect outputs (e.g., wherein errors of different types and/or severities can be penalized differently, such as based on costs and/or other undesirable consequences resulting from occurrence of the error). Each entry of the rewards matrix is preferably determined based on (e.g., is a function of, such as a function including addition, subtraction, multiplication, exponentiation, and/or any suitable operations, etc.) the output and/or the associated label (e.g., the true fullness metric), and can additionally or alternatively be determined based on: a weight value corresponding to the output, a weight value corresponding to the true fullness metric, and/or any other suitable values or weights. In one example, errors associated with low fullness metrics (e.g., wherein the model-predicted and/or true fullness metric less than a threshold value, such as 5, 10, 15, 20, 25, 30, 0-10, 10-20, or 20-30%, etc.) can be penalized more heavily than errors not associated with low fullness metrics; in this example the rewards matrix is preferably designed to penalize the outputs of the neural network accordingly. For example, a first situation, in which the model determines that the fullness metric is 30% when the true fullness metric is 0%, can be considered worse than a second situation, in which the model determines that the fullness metric is 60% when the true fullness metric is 30% (e.g., even though the absolute difference between the model determination and the true fullness metric is the same for both situations).

Figure 10B:
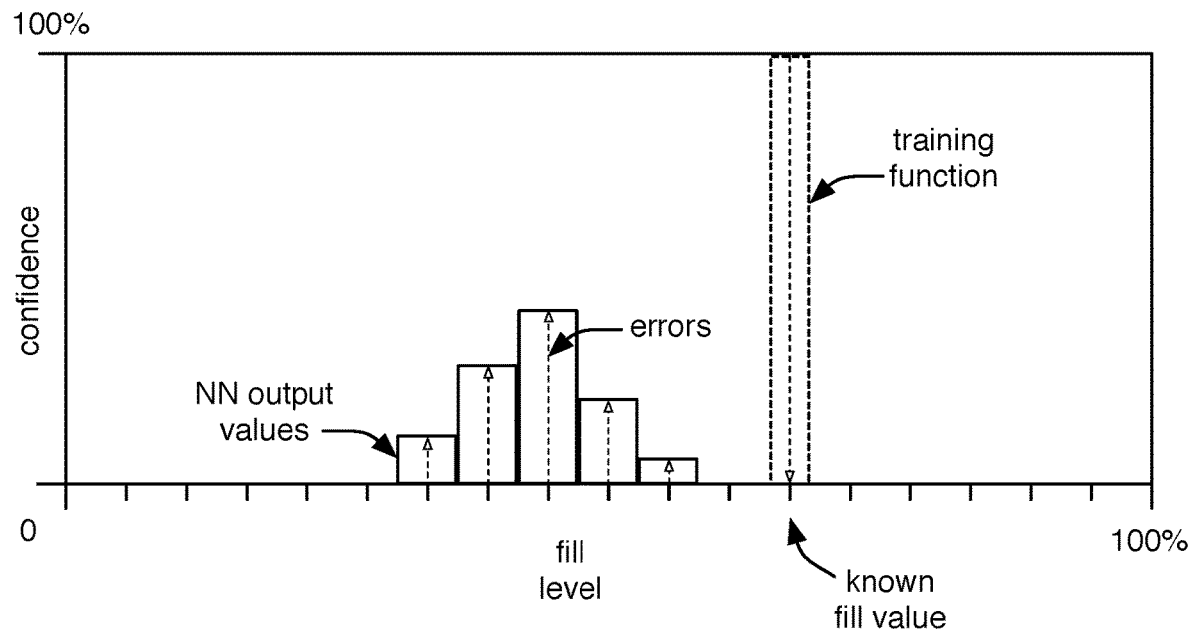
Figure 10B:
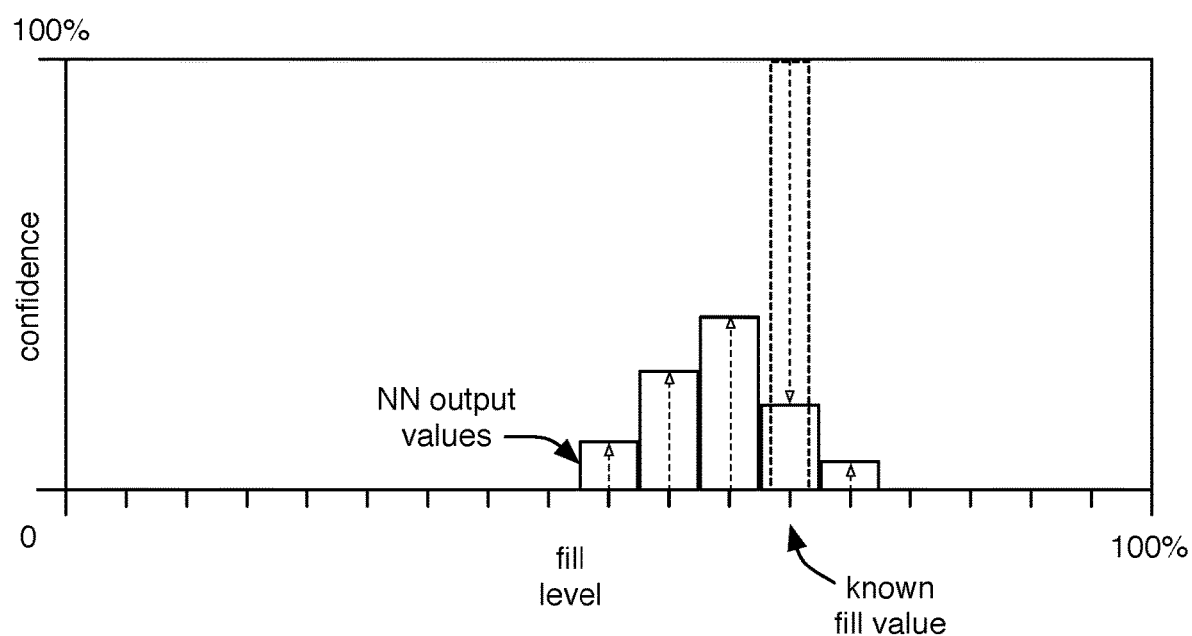

Alternatively, all incorrect outputs can be penalized equally (e.g., as shown in FIG. 10B), such as in a 1-hot training approach. The neural network can be trained using any suitable training technique(s).

S200 can additionally or alternatively include training the diverter model (e.g., unsuitable label determination model), which can function to train a model for determining an image depicting a suitable container interior (e.g., determine whether an image depicts a suitable container interior, score images based on suitability, etc). The model is preferably trained using the training data received in S100 (e.g., using the additional training set described above, using images and/or other information from the training set for the fullness model, etc.), but can additionally or alternatively be trained using any other suitable data.

Figure 12:
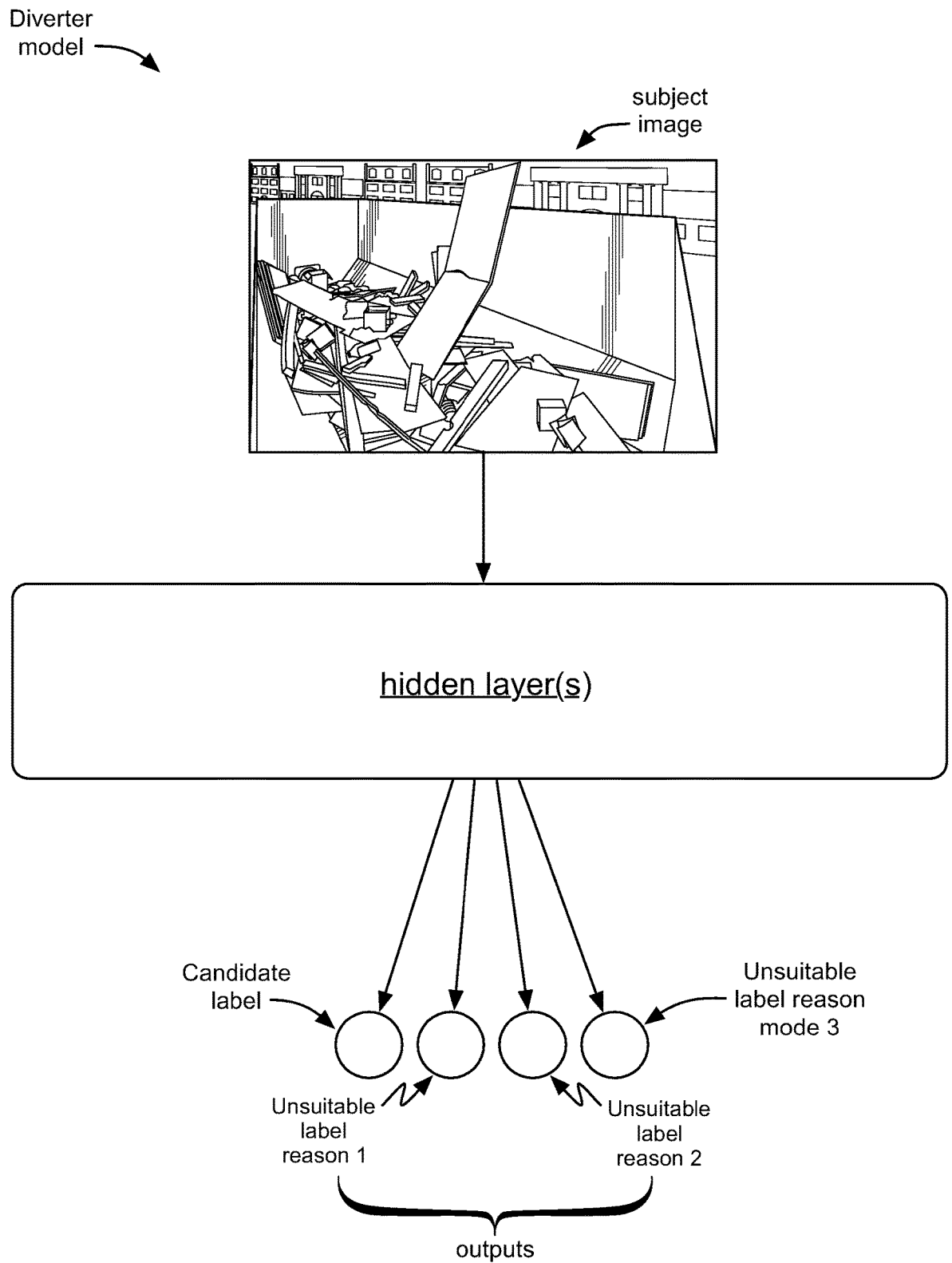
FIG. 12 is a schematic representation of an embodiment of a diverter neural network.

The diverter model preferably accepts a single image input, such as depicted in FIG. 12, but can additionally or alternatively accept inputs including multiple images, auxiliary sensor data (e.g., ultrasound data, TOF sensor data, etc.), and/or any other suitable data or information (e.g., in addition to and/or in place of image data).

The input image for the diverter model ("diverter model subject image") can have some or all characteristics (e.g., dimension, image type, brightness, contrast, color mode, etc.) in common with the subject image for the fullness model, and/or can differ from the fullness model subject image in any suitable manner. For example, the subject images can be the same image, one can be a derivative (e.g., cropped, interpolated, scaled, blurred, having altered pixel characteristics such as brightness, contrast, color, etc.) of the other, or the subject images can both be derivatives of a parent image. However, the subject images can additionally or alternatively be otherwise related, or can be unrelated. The diverter model subject image can be a grayscale image, color image (e.g., wherein the red, green, and blue channels are provided as three separate inputs to the neural network), and/or an image of any other suitable type. The image can additionally or alternatively be pre-processed (e.g., to normalize brightness and/or contrast, crop, align, undistort, etc.). In some embodiments, the subject image is an image group (e.g., stereoscopic image pair, images captured from opposing ends of a container, etc.) rather than a single image. In some embodiments, the neural network additionally or alternatively accepts auxiliary data as an input. However, the diverter model can additionally or alternatively accept any other suitable inputs.

The diverter model preferably includes a neural network, such as a network including one or more layers such as described above with respect to the fullness model (e.g., including one or more aspects in common with and/or similar to the fullness model, including aspects associated with alternative elements of the fullness model described above, etc.), but can additionally or alternatively include neural networks of any other suitable structure, and/or can include any other suitable model elements.

The diverter model preferably provides multiple output values, each preferably corresponding to a different label (e.g., candidate label, unsuitable label, unsuitable label reason, etc.), such as depicted by way of example in FIG. 12. In a first example, the CNN includes 4 outputs, each corresponding to a different label, such as a candidate label and three unsuitable label reasons. In a second example, the CNN includes 2 outputs, the first corresponding to a candidate label and the second corresponding to an unsuitable label.

Preferably, each output represents a likelihood of and/or confidence in the corresponding candidate label and/or unsuitable label. In one such example, the outputs can be the outputs of a softmax classifier. In a second such example, the diverter model has a single output (e.g., regression output, wherein the output value represents the probability that the image is associated with a candidate label). Alternatively, the diverter model can provide a classification without such corresponding information. For example, the diverter model can include a one-hot output indicating the classification. However, the diverter model can additionally or alternatively include any other suitable outputs.

The loss function for training the diverter model can be a classification loss function, such as cross entropy loss or hinge loss (multi-class SVM loss), but can additionally or alternatively be any other suitable loss function.

However, the diverter model can additionally or alternatively be otherwise trained, and/or can additionally or alternatively include any other suitable elements.

3.3 Selecting References

Selecting reference images S300 preferably functions to select a reference image of each container (e.g., of the substantially empty container). S300 can optionally include determining the target fill level for the reference images. The target fill level is preferably zero, but can alternatively be any other suitable value (e.g., between 0 and 100%).

Figure 7:
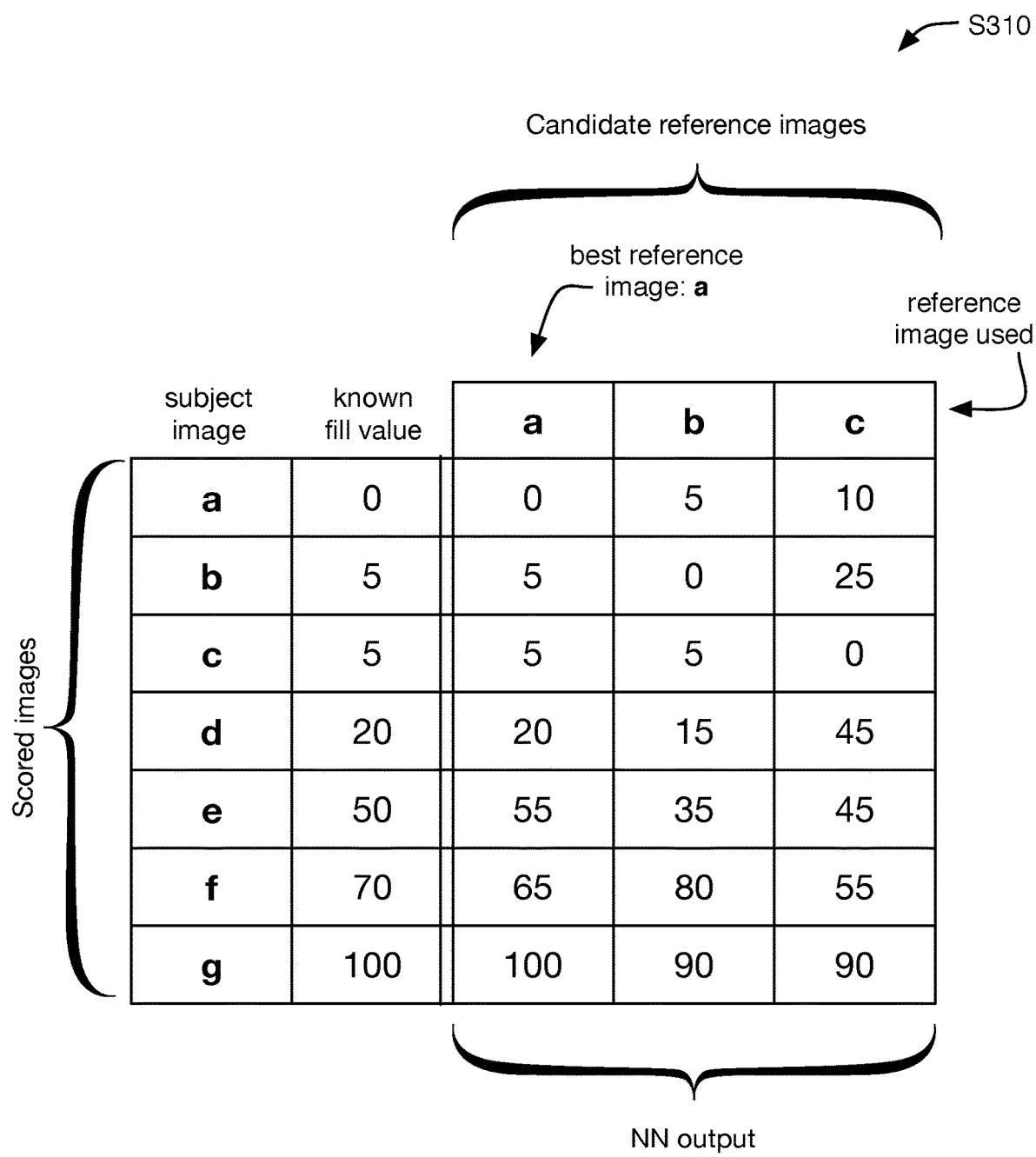
FIG. 7 is a schematic representation of an example of selecting a reference image.

S300 includes selecting a reference image of a container S310 (e.g., as shown in FIG. 7). S310 is preferably performed for each container, but can alternatively be performed for a subset of containers (e.g., each type of container) and/or for any other suitable containers. The reference image S300 is preferably an image sampled by the content sensor mounted to the subject container (the container for which the reference image is selected), but can alternatively be any other suitable image.

For a particular container, S310 preferably includes considering the set of scored images (or image groups) of the container. A scored image is preferably an image for which the true fill level is known, but can additionally or alternatively be an image for which a scored fill level distribution (e.g., associated with estimate(s) of the fill level) is known, and/or can be an image associated with any other suitable fill level label. Estimating the fill level can include evaluating the average of the scored distribution, evaluating the weighted average of the scored distribution, and/or otherwise estimating the fill level. The set of scored images preferably includes only images for which the fill level was determined by one or more humans, but can additionally or alternatively include images associated only with computer-determined fill levels (e.g., determinations made using sensor fusion, determinations made auxiliary sensor signals, determinations made image analysis such as by a neural network, etc.) and/or images associated with fill levels determined in any other suitable manner.

In some embodiments, S310 can include receiving a batch of images (e.g., wherein some or all images of the batch are associated with the same subject container identifier, not associated with the same subject container identifier, and/or not associated with any container identifier). Receiving a batch of images can additionally include receiving a set of scores associated with some or all images of the batch (e.g., defining a set of scored images). The set of scored images can be used to evaluate a set of candidate reference images, wherein the set of candidate reference images can be a subset of the batch of images, and/or any other suitable candidate reference image set.

S310 can include selecting a subset of the scored images for which the known fill level is within a threshold distance of the target fill level. This preferably includes selecting all such images for which this criterion is satisfied, but can alternatively include selecting any suitable subset thereof. For a target fill level of zero (empty), this can include selecting all images for which the known fill level is less than a threshold amount (e.g., the threshold distance, such as described above regarding S200).

S310 preferably includes, for each image of the subset, using the trained neural network to determine fill levels for all images of the set of scored images (e.g., as described below in S400, preferably without using an alternative technique for uncertain outputs), wherein the respective image of the subset is used as the reference image.

The image for which the trained neural network performed best (e.g., closest to the known fill level values) is preferably selected as the reference image. Neural network performance is preferably determined based on the difference between fill level determinations (e.g., between the known fill level and the fill level determined by the trained neural network) of one or more images. For example, the performance can be determined based on the average difference, median difference, maximum difference, difference at a predetermined percentile, and/or difference metric associated with any other suitable image or set of images. The performance can additionally or alternatively be determined based on the uncertainty associated with the determinations (e.g., wherein low uncertainty for correct or nearly-correct assessments represents superior performance, wherein high uncertainty for incorrect assessments represents superior performance, etc.). However, neural network performance can additionally or alternatively be determined based on any other suitable criteria.

Alternatively, S310 can include selecting the image (or image group) with the lowest known fill value, selecting a random image (or image group) from the set of images with sufficiently low fill value (e.g., fill value below the threshold), selecting the most recently captured scored image with a sufficiently low value, and/or selecting any other suitable reference image.

However, S300 can additionally or alternatively include selecting the reference images in any other suitable manner.

3.4 Determining Container Fill Level

Figure 8:
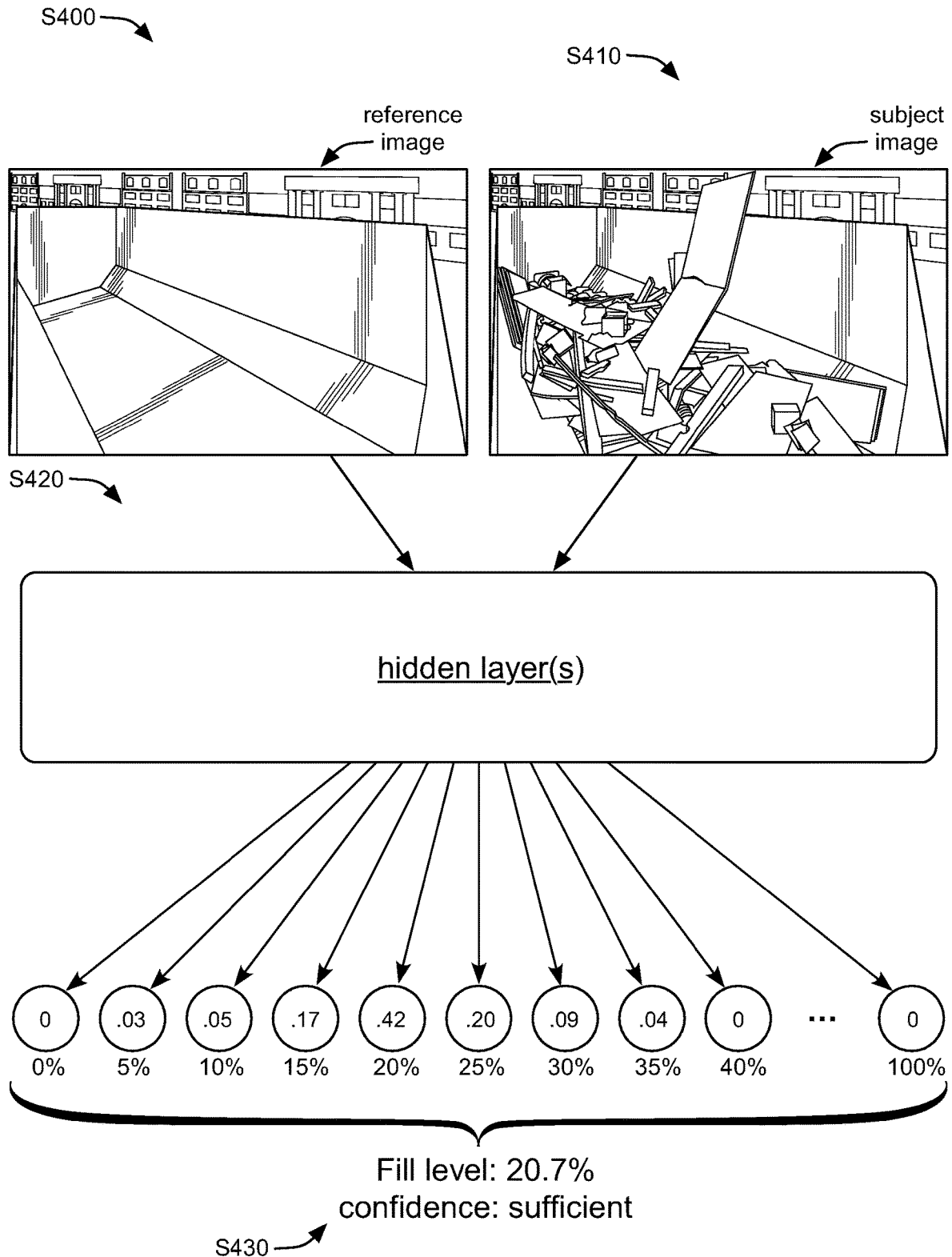
FIG. 8 is a schematic representation of an example of determining a container fill level.
Figure 9:
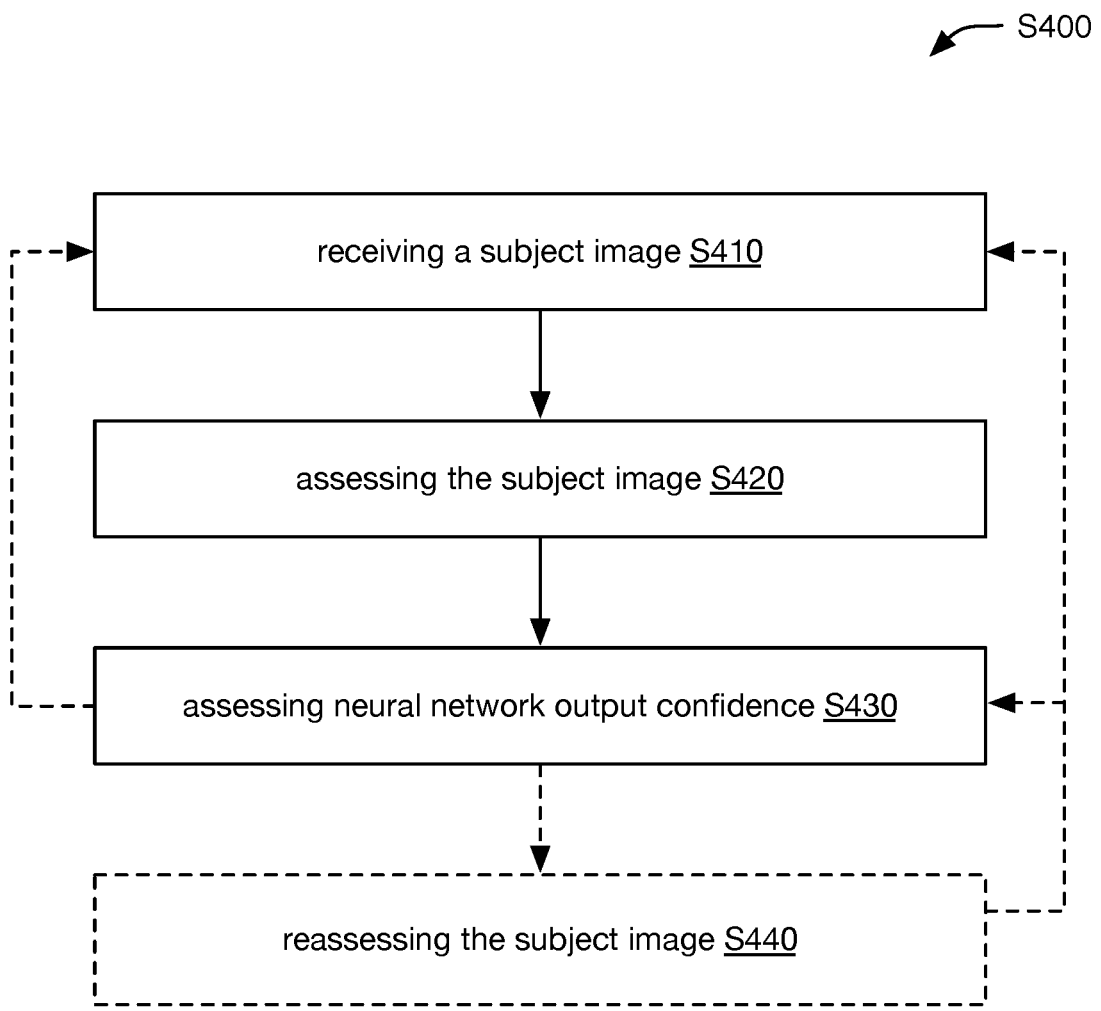
FIG. 9 is a schematic representation of an embodiment of determining a container fill level.

Determining a container fill level S400 preferably functions to assess images with unknown fill levels (e.g., as shown in FIG. 8). S400 preferably includes receiving a subject image S410, assessing the subject image using the trained neural network S420, and/or assessing the confidence of the neural network output S430, and can optionally include reassessing the subject image S440 (e.g., as shown in FIG. 9). However, S400 can additionally or alternatively include any other suitable elements.

S400 can be performed for any suitable set of images. In a first example, S400 is performed for each image captured by an imaging device (e.g., mounted to the subject container). In a second example, S400 is performed for each substantially unique image (e.g., having at least a threshold difference from previously-captured images). In a third example, S400 is performed with a predetermined frequency (e.g., performed for a threshold number of images, such as 1, 2, 3, 4, 5, 10, 20, 50, 1-5, 5-20, or 20-100 images, in a time interval, such as a minute, hour, day, week, month, or year; performed for a threshold subset of images, such as once for every 2, 3, 4, 5, 10, 20, 50, 2-5, 5-20, or 20-100 images captured; etc.). In a fourth example, S400 is performed in response to one or more triggers (e.g., user request to assess an image, auxiliary sensor data indicative of a trigger event, etc.). However, S400 can additionally or alternatively be performed for any other suitable set of images and/or with any other suitable timing.

S410 preferably includes receiving an image (or image group) of a container (e.g., received in association with the container ID). The image is preferably an image such as described above (e.g., regarding S100), but can additionally or alternatively be any other suitable image. The image can be received from an imaging device (e.g., transmitted by the imaging device upon capture, in response to data connection availability, etc.), received from storage (e.g., from a database of a computing system, such as the remote server), received from a user (e.g., uploaded by the user in order to be assessed), received from the diverter model, and/or received from any other suitable entity.

In some embodiments, S410 is performed for one or more containers (e.g., includes receiving images of the one or more containers), such as containers represented in the training set and/or containers not represented in the training set. However, S410 can additionally or alternatively include receiving any other suitable images in any suitable manner.

Figure 13:
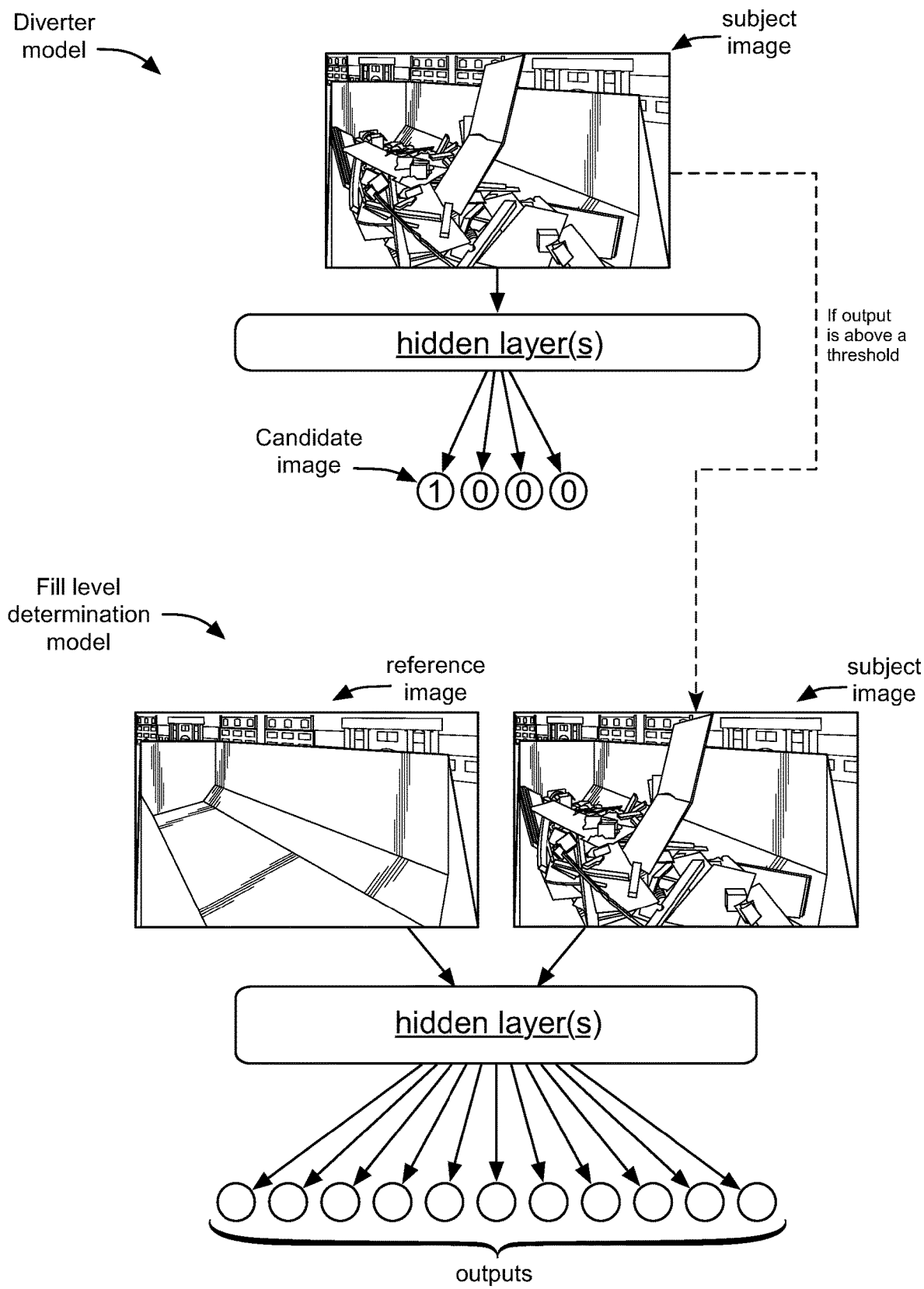
FIG. 13 is a schematic representation of an embodiment of chained neural networks.
Figure 14A:
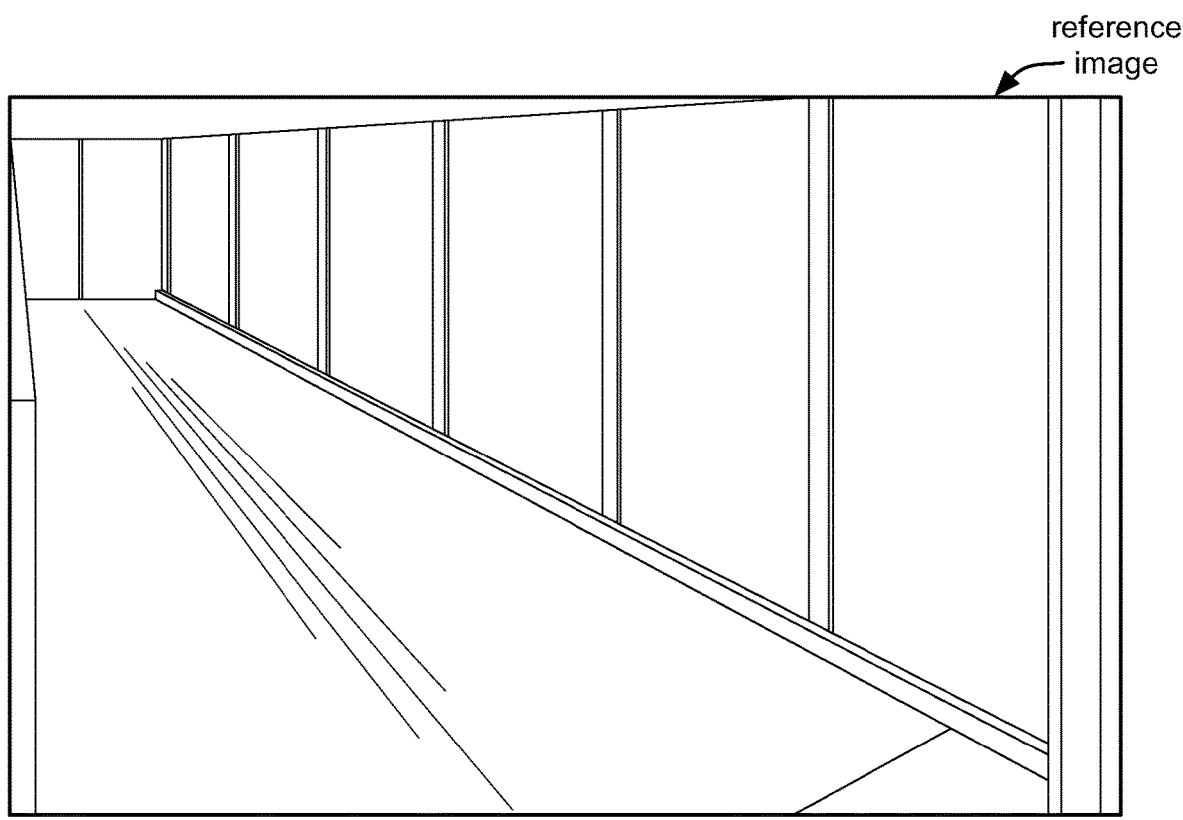
FIGS. 14A-14B are depictions of an example of a reference image and a subject image, respectively, of a container.
Figure 14B:
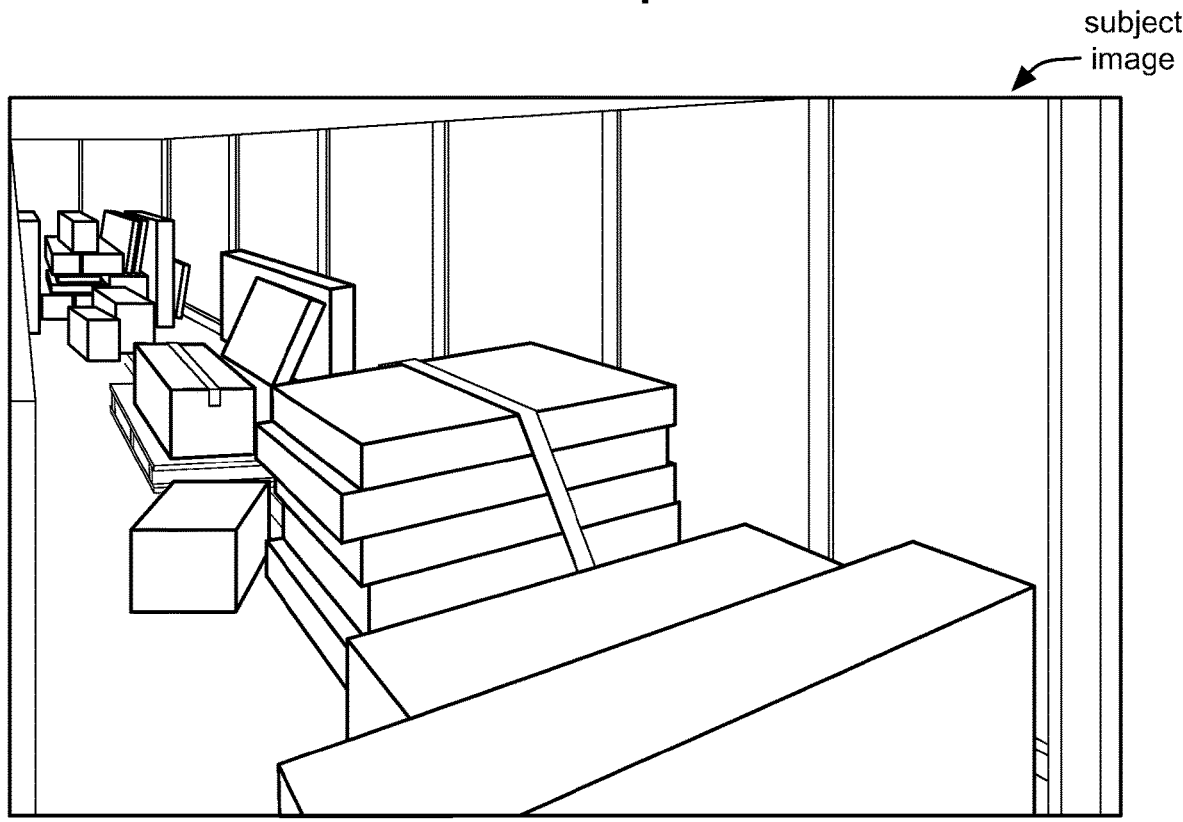

In some embodiments, receiving the subject image can include processing the subject image using the diverter model (e.g., to determine if the image depicts a suitable container interior). In such embodiments, the image can be selectively served or not served to the fullness model based on the output of the diverter model. For example, images determined (e.g., by the diverter model) to be candidate images and/or to have a likelihood of being a candidate image greater than a threshold (e.g., 30%, 50%, 80%, 90%, 95%, 99%, less than 30%, 30-50%, 50-80%, 80-95%, 95-99%, 99-100%, etc.) can be provided as input to the fullness model, whereas other images (e.g., determined to be unsuitable, likely to be unsuitable, probability of being unsuitable greater than a threshold, etc.) can be not provided as input (e.g., can be discarded, can be directed for alternate analysis such as human analysis, etc.), such as shown by way of example in FIG. 13. However, S400 can additionally or alternatively include combining (e.g., chaining) the diverter model and fullness model in any other suitable manner, or can include not combining the models.

S420 preferably includes determining the associated reference image (or image group) for the subject image. The reference image is preferably determined based on the associated container (e.g., based on the container ID), but can additionally or alternatively be determined in any other suitable manner. The same reference image can be used for a given container for each performance of S400. Alternatively, different reference images can be determined and/or used: each time the container is emptied, after (e.g., in response to) receipt of additional training data (e.g., used to updated the neural network training), at a predetermined frequency, and/or with any other suitable timing. S420 preferably includes inputting the subject and reference images into the trained neural network, and determining the fill level of the subject image based on the neural network output.

In some embodiments, the fill level is determined as the weighted average of the outputs (e.g., the average of the fill levels associated with each output, wherein each fill level is weighted by its respective output value (likelihood)). Alternatively, determining the fill level can include assuming a statistical distribution of the outputs (e.g., Gaussian distribution, semi or fully bounded Johnson distribution, etc.), wherein the fill level is determined based on a maximum likelihood estimation using the assumed distribution.

In some embodiments, outputs near the fill level bounds (e.g., 0 and/or 100%) can be handled as special cases. In a first example, when the determination (e.g., based on the weighted average) is within a threshold distance (e.g., 2%, 5%, 10%, 15%, 0-5%, 5-15%, etc.) of a bound, the determination can be set equal to a default value (e.g., the boundary value). For example, a weighted average above 90% can be set to a default value of 100% and a weighted average below 10% can be set to a default value of 0. In a second example, a maximum likelihood estimation can be performed, preferably using a semi-bounded (or fully-bounded) distribution (e.g., semi-bounded Johnson distribution, such as a log-normal distribution). However, S420 can additionally or alternatively include assessing the subject image in any other suitable manner.

Assessing confidence of the neural network output S430 preferably includes determining a metric associated with spread of the outputs. In examples, the spread metric can include the range, interquartile range, variance, standard deviation, density within a threshold band, and/or any other suitable metric. In a specific example, the metric is the sum of outputs within a threshold distance from the determined fill level (e.g., within 5%, 10%, 15%, 20%, etc.). If the spread metric is beyond a threshold spread value (e.g., the outputs exhibit more spread than the threshold), the neural network output confidence is low. For example, if less than a threshold sum falls within the threshold distance of the determined fill level (e.g., less than 50% of the output value is within plus or minus 15% of the value determined in S420), the confidence is determined to be low.

In response to determining that the neural network confidence is low, S400 preferably includes reassessing the subject image (e.g., as described below regarding S440). Alternatively, if the neural network output confidence is determined to be sufficient (e.g., if the spread of the neural network outputs is less than the spread threshold), the value determined in S420 is preferably used (e.g., preferably stored in association with the image). However, S430 can additionally or alternatively include assessing confidence of the neural network output in any other suitable manner.

Reassessing the subject image S440 can function to determine the fill level with additional certainty. The subject image is preferably reassessed using a different assessment technique than used in S420. For example, the subject image can be assessed using a human classifier (or set of multiple humans, such as operating on a consensus basis), assessed using a different neural network than the trained neural network, and/or reassessed in any other suitable manner. S440 is preferably performed for images for which the neural network outputs exhibit low confidence (e.g., as described above regarding S430). S440 can additionally or alternatively be performed for randomly selected images (e.g., a predetermined fraction of all images assessed in S420) and/or any other suitable images. Images reassessed in S440 are preferably added to a training set (e.g., the training set received as described above regarding S100), in association with the fill value determined in S440, such as for future performance of other elements of the method (e.g., such as S200 and/or S300).

However, S400 can additionally or alternatively include determining the container fill level in any other suitable manner.

3.5 Container State Changes

In some embodiments, the method can include determining information associated with container state changes (e.g., contents addition and/or removal), preferably based on the fill level(s) of the container (e.g., determined as described above, such as regarding S400). For example, the method can include determining (e.g., detecting, confirming, etc.) whether a container service event (e.g., dumpster unloading event) occurred for a particular container.

Determining whether the container service event occurred S900 can be performed in response to a trigger (e.g., auxiliary data and/or user input indicative of potential container servicing), based on a container service schedule (e.g., schedule assigned to a container service provider, such as a predetermined schedule), periodically, and/or with any other suitable timing. In a first example, a person associated with container servicing (e.g., a container service provider) provides an input (e.g., via a client of a user device such as a smartphone, via a dedicated hardware input, via communication with a remote computing system, etc.) indicating that a container service event was performed for a particular container (preferably providing the input during and/or after performing a container service event for the container, such as emptying a dumpster), wherein S900 is performed in response to receiving the input. In a second example, S900 is performed in response to accelerometer data indicative of a potential container service event (e.g., classified as such based on heuristics, models such as random forest classifiers, etc.). In a third example, S900 is performed after a container service event is due for the container (e.g., based on the service schedule). However, S900 can additionally or alternatively be performed with any other suitable timing.

S900 preferably includes comparing the container fill level at various points in time (e.g., before and after the suspected and/or purported service event, throughout a time series encompassing the suspected and/or purported service event, etc.). For example, the fill level of an image captured after the trigger event (e.g., the next image captured, image captured within a threshold time period such as 1 min, 10 min, 1 hr, etc.) can be compared to the fill level of an image captured before the trigger event (e.g., the most recent previously-captured image, image captured within a threshold time period such as 1 min, 10 min, 1 hr, etc.). The fill levels are preferably determined as described above, but can additionally or alternatively be determined in any other suitable manner.

A rapid reduction (e.g., occurring within a threshold time period, such as less than 10 s, 20 s, 1 min, 5 min, 20 min, 10-60 s, 1-10 min, 10-100 min, etc.) and/or significant reduction (e.g., more than a threshold fill level change, such as 5%, 10%, 15%, 25%, 50%, 80%, 95%, 0-5%, 5-20%, 20-50%, 50-80%, 80-100%, etc.; reduction to less than a threshold final fill level, such as 20%, 15%, 10%, 5%, 2%, 1%, 0-5%, 5-15%, 15-30%, etc.) in container fill level can be indicative of service event occurrence, whereas the lack of such a reduction can be indicative of the absence of any service event. In response to determining whether a container service event occurred, the analyzed images (and/or auxiliary data) can optionally be stored (e.g., in association with data indicative of the trigger), provided to users of the system (e.g., customer and/or service provider associated with the container), and/or used in any other suitable manner.

3.6 Contamination Assessment

In some embodiments, the method 10 (and/or elements thereof, such as determining a container fill level S400) can be applied as part of one or more methods for contamination assessment. For example, the method for contamination assessment described in U.S. patent application Ser. No. 17/145,021, filed 8 Jan. 2021 and titled "Method and System for Contamination Assessment", which is herein incorporated in its entirety by this reference, can include performance of one or more elements described herein regarding the method 10; for example, 'sorting the images S200' of U.S. patent application Ser. No. 17/145,021 can include determining the fill level of one or more images (e.g., all images to be sorted, or a subset thereof) such as described herein (e.g., described herein regarding S400 and/or associated elements of the method 10). In one example, in which a classifier (e.g., neural network or other statistical classifier, such as described above in more detail) is configured (e.g., has been trained) to determine fill levels as described above, a reference image for the relevant container is selected (e.g., as described above, such as regarding S300), and, for each image to be sorted (or a subset thereof), the image to be sorted and the reference image are provided to the classifier as input, wherein the classifier determines the fill level of the image to be sorted based on the input. For example, the classifier can be a convolutional neural network that accepts an input including both the reference image and the image to be sorted, wherein the two images are stacked along a depth dimension orthogonal to the image spatial dimensions (e.g., as described above in more detail); however, the classifier can additionally or alternatively have any other suitable characteristics and/or can accept the input in any other suitable format.

Additionally or alternatively, the method for contamination assessment described in U.S. patent application Ser. No. 17/145,021 can be performed independent from any or all aspects described herein regarding the method 10. For example, 'sorting the images S200' of U.S. patent application Ser. No. 17/145,021 can additionally or alternatively include determining the fill level of one or more images (e.g., all images to be sorted, or a subset thereof) in one or more manners distinct from those described herein regarding the method 10. In specific examples, the fill level(s) can be determined by human classifiers (e.g., based on the image(s) and/or on any other suitable information), by other computerized image analysis methods (e.g., using other statistical classifiers, machine learning techniques, and/or computer vision techniques), based on auxiliary information (e.g., sensor information associated with the containers and/or images, such as weight information, proximity sensor information, etc.), and/or in any other suitable manner.

In some examples, the method for contamination assessment described in U.S. patent application Ser. No. 17/145,021 can additionally or alternatively include training one or more statistical classifiers, machine learning elements, and/or computer vision elements (e.g., as described therein regarding 'training an image classifier S700'). For example, the method for contamination assessment described in U.S. patent application Ser. No. 17/145,021 can include training one or more neural networks (e.g., deep neural network, convolutional neural network, etc.) to detect contaminants depicted in images (e.g., images of container contents such as described herein and/or any other suitable images). In a specific example, such training can include receiving images (e.g., images of container contents such as described herein) and associated image labels indicative of contaminant contents depicted in the images (e.g., one or more quantity metrics, such as count, volume, weight, etc., associated with one or more specific contaminant types such as bulky items and/or black bags, with overall contaminants, and/or with any suitable subsets thereof), and using these images to perform the training (e.g., using the associated image labels to direct the training). The received images can be images captured by images sensors (e.g., as described above regarding the container contents images), generated images (e.g., generated by artificially adding depictions of one or more contaminants to captured images, generated entirely artificially, etc.), and/or any other suitable images.

However, the method can additionally or alternatively include any other suitable elements performed in any suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

The invention claimed is:

1. A method for fullness metric assessment, comprising:
    training a fullness metric classifier configured to classify fullness of container interiors by providing the classifier with a training set comprising a plurality of images of different container types in different states of fill;
    receiving, from a content sensor, a subject image depicting a subject container interior of a subject container; and
    using the fullness metric classifier, determining a fullness metric associated with the subject image, comprising:
        providing the subject image and a reference image to the fullness metric classifier as an input, wherein the reference image depicts the subject container interior in the target fullness state of waste; and
        in response to providing the subject image and the reference image to the fullness metric classifier, receiving, from the fullness metric classifier, information indicative of the fullness metric, wherein the information indicative of the fullness metric is determined based on the training set.

2. The method of claim 1, wherein:
    an empty container state is defined by a fullness metric value of zero; and
    the target fullness state is defined by a fullness metric value less than a threshold value.

3. The method of claim 1, wherein, in the target fullness state, the subject container interior defines an occupied volume fraction less than 20%, wherein the occupied volume fraction is equal to an occupied volume of the subject container interior divided by a volumetric capacity of the subject container interior.

4. The method of claim 1, wherein:
    the subject container interior defines a container floor;
    the fullness metric is defined as an occupied floorspace fraction of the subject container; and
    the occupied floorspace fraction is equal to an occupied floor area of the container floor divided by a total floor area of the container floor.

5. The method of claim 4, wherein, in the target fullness state, the subject container interior defines an occupied floorspace fraction less than 10%.

6. The method of claim 4, wherein the subject container is an intermodal freight container.

7. The method of claim 1, wherein the fullness metric is defined as an occupied volume fraction of the subject container, wherein the occupied volume fraction is equal to an occupied volume of the subject container interior divided by a volumetric capacity of the subject container interior.

8. The method of claim 1, wherein the fullness metric classifier comprises a neural network.

9. The method of claim 8, wherein, the subject image and the reference image each define a respective set of spatial dimensions, and wherein providing the subject image and a reference image to the fullness metric classifier as the input comprises:
    generating a convolutional neural network (CNN) input comprising the subject image and the reference stacked along a channel dimension, wherein each spatial dimension of the respective sets is orthogonal to the channel dimension; and
    providing the CNN input to the neural network, wherein the neural network is a CNN.

10. The method of claim 1, further comprising, before receiving the reference image: selecting the reference image from a set of candidate reference images, wherein each candidate reference image of the set depicts the subject container interior in the target fullness state.

11. The method of claim 1, further comprising, before providing the subject image to the fullness metric classifier, determining, using a statistical classifier, that the subject image is valid, comprising determining that the subject image depicts a container interior, wherein providing the subject image to the fullness metric classifier is performed in response to determining that the subject image is valid.

12. The method of claim 11, wherein the fullness metric classifier comprises a first trained neural network, wherein the statistical classifier comprises a second trained neural network distinct from the fullness metric classifier.

* * * * *